(12) United States Patent
Moon et al.

(10) Patent No.: US 12,192,455 B2
(45) Date of Patent: ***Jan. 7, 2025

(54) IMAGE ENCODING METHOD/DEVICE, IMAGE DECODING METHOD/DEVICE AND RECORDING MEDIUM HAVING BITSTREAM STORED THEREON

(71) Applicant: INDUSTRY ACADEMY COOPERATION FOUNDATION OF SEJONG UNIVERSITY, Seoul (KR)

(72) Inventors: Joo Hee Moon, Seoul (KR); Dong Jae Won, Goyang-si (KR); Sung Won Lim, Seoul (KR)

(73) Assignee: Industry Academy Cooperation Foundation of Sejong University, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,171

(22) Filed: Aug. 24, 2023

(65) Prior Publication Data

US 2024/0015286 A1     Jan. 11, 2024

Related U.S. Application Data

(63) Continuation of application No. 17/857,117, filed on Jul. 4, 2022, now Pat. No. 11,778,179, which is a
(Continued)

(30) Foreign Application Priority Data

Jan. 20, 2017  (KR) ........................ 10-2017-0009631
Jan. 20, 2017  (KR) ........................ 10-2017-0009632

(51) Int. Cl.
*G06K 9/36*       (2006.01)
*H04N 19/117*    (2014.01)
(Continued)

(52) U.S. Cl.
CPC ........... *H04N 19/117* (2014.11); *H04N 19/13* (2014.11); *H04N 19/176* (2014.11); *H04N 19/436* (2014.11); *H04N 19/82* (2014.11)

(58) Field of Classification Search
CPC ..... G06T 1/0021; G06T 19/003; G06T 15/10; G06T 7/55; G06T 3/40; G06T 5/002;
(Continued)

(56) References Cited

U.S. PATENT DOCUMENTS 9,473,784 B2   10/2016  Mody et al.
11,412,218 B2   8/2022  Moon et al.
(Continued)

FOREIGN PATENT DOCUMENTS

CN    101389021 A    3/2009
CN    101543074 A    9/2009
(Continued)

OTHER PUBLICATIONS

Chang, Yu-Lin et al., "CR8 Subset3: Controlled Clipping", *hmmJoint Collaborative Team on Video Coding (JCT-VC) of ITU-T SG16 WP3 and ISO/IEC JTC1/SC29/WG11*, 4th Meeting: Daegu, Republic of Korea, Jan. 20-28, 2011 (12 pages in English).
(Continued)

*Primary Examiner* — Duy M Dang
(74) *Attorney, Agent, or Firm* — NSIP Law

(57) ABSTRACT

The present invention provides an image encoding method and an image decoding method. The image decoding method, according to the present invention, comprises the steps of: decoding information associated with a clipping range of a current block; and performing sample adaptive offset (SAO) filtering on the basis of the information associated with the clipping range, wherein the information associated with the clipping range may include information
(Continued)

on the maximum and minimum values of a pixel value included in the current block.

9 Claims, 22 Drawing Sheets

Related U.S. Application Data continuation of application No. 16/478,557, filed as application No. PCT/KR2018/000731 on Jan. 16, 2018, now Pat. No. 11,412,218.

(51) Int. Cl.
*H04N 19/13* (2014.01)
*H04N 19/176* (2014.01)
*H04N 19/436* (2014.01)
*H04N 19/82* (2014.01)

(58) Field of Classification Search
CPC ......... G06T 5/003; G06T 5/50; G06T 7/0002; G06T 9/002; G06T 2207/20084; G06T 2207/20172; G06T 2207/20182; H04N 1/32336; H04N 13/0275; H04N 13/0278; H04N 13/0282; G06F 16/583; G06K 9/00201; G06N 20/20; G06N 3/0454; G06N 3/063; G06N 3/08
See application file for complete search history.

(56) References Cited

U.S. PATENT DOCUMENTS

| | | | |
|---|---|---|---|
| 11,778,179 B2* | 10/2023 | Moon | ................... H04N 19/82 |
| 2015/0036738 A1 | 2/2015 | Garud et al. | |
| 2015/0189296 A1 | 7/2015 | Alshina et al. | |
| 2015/0237376 A1 | 8/2015 | Alshina et al. | |
| 2016/0286213 A1 | 9/2016 | Lee et al. | |

FOREIGN PATENT DOCUMENTS

| | | |
|---|---|---|
| CN | 105744157 A | 7/2016 |
| CN | 105993174 A | 10/2016 |
| JP | 2017-5504 A | 1/2017 |
| KR | 10-2015-0068921 A | 6/2015 |
| KR | 10-1671381 B1 | 11/2016 |
| WO | WO 2013/070955 A2 | 5/2013 |

OTHER PUBLICATIONS

International Search Report issued on Apr. 19, 2018 in counterpart International Patent Application No. PCT/KR2018/000731 (2 pages in English and 2 pages in Korean).

* cited by examiner

IMAGE ENCODING METHOD/DEVICE, IMAGE DECODING METHOD/DEVICE AND RECORDING MEDIUM HAVING BITSTREAM STORED THEREON

CROSS REFERENCE TO RELATED APPLICATIONS

This application is a continuation of U.S. application Ser. No. 17/857,117, filed on Jul. 4, 2022, which is a continuation of U.S. application Ser. No. 16/478,557, filed on Jul. 17, 2019, which is a U.S. National Stage Application of International Application No. PCT/KR2018/000731, filed on Jan. 16, 2018, which claims the benefit under 35 USC 119(a) and 365(b) of Korean Patent Application No. 10-2017-0009631, filed on Jan. 20, 2017 and Korean Patent Application No. 10-2017-0009632, filed on Jan. 20, 2017, in the Korean Intellectual Property Office, the entire disclosures of which are incorporated herein by reference for all purposes.

TECHNICAL FIELD

The present invention relates to an image encoding/decoding method and device and, more particularly, to an image encoding/decoding method and device capable of improving compression efficiency by using a pixel range for an arbitrary image area.

BACKGROUND ART

In recent years, demand for multimedia data such as video has been rapidly increasing on the Internet. However, development of technology for improving channel bandwidths to keep up with the rapid changes in the demand for multimedia data is difficult. As part of this trend, the Video Coding Expert Group (VCEG) of ITU-T and the Moving Picture Expert Group (MPEG) of ISO/IEC which are international standardization organizations are studying video compression standards through cooperative research.

DISCLOSURE

Technical Problem

An objective of the present invention is to provide an image encoding/decoding method and device capable of improving compression efficiency in image encoding/decoding.

It is another object of the present invention to provide an image encoding/decoding method and device capable of improving compression efficiency by using a pixel range for an arbitrary image area in image encoding/decoding.

It is another object of the present invention to provide a computer-readable recording medium storing a bitstream generated by a video encoding method/device according to the present invention.

Technical Solution

An image decoding method according to the present invention includes decoding information associated with a clipping range of a current block; and performing sample adaptive offset (SAO) filtering on the basis of the information associated with the clipping range, wherein the information associated with the clipping range includes information on a maximum value and a minimum value of a pixel value included in the current block.

In the image decoding method according to the present invention, the information associated with the clipping range of the current block may be transmitted in units of the current block or an arbitrary region including the current block.

In the image decoding method according to the present invention, the arbitrary region unit may include at least one of a picture unit, a tile unit, and a slice unit.

In the image decoding method according to the present invention, the information on the maximum value and the minimum value may include information on one of the maximum value and the minimum value and information on a difference between the maximum value and the minimum value.

In the image decoding method according to the present invention, when the SAO mode for the current block is a band offset (BO) mode, the method may further includes: decoding an initial band point associated with a start position of a band section to which the band offset is applied; and decoding M pieces of offset information for the band section to which the band offset is applied, wherein the M is determined on the basis of the decoded initial band point and at least one of the minimum value and the maximum value.

In the image decoding method according to the present invention, when the SAO mode for the current block is a band offset mode, the method may further include: re-dividing a section between the maximum value and the minimum value into 32 bands, wherein an initial band point associated with a start position of a band section to which the band offset is applied is a point for the 32 bands obtained by the re-division.

An image encoding method according to the present invention includes determining a clipping range of a current block; performing sample adaptive offset (SAO) filtering on the basis of the clipping range; and encoding information associated with the clipping range, wherein the information associated with the clipping range includes information on a maximum value and a minimum value of a pixel value included in the current block.

In the image encoding method according to the present invention, the information associated with the clipping range of the current block may be encoded in units of the current block or an arbitrary region including the current block.

In the image encoding method according to the present invention, the arbitrary region unit may include at least one of a picture unit, a tile unit, and a slice unit.

In the image encoding method according to the present invention, the information on the maximum value and the minimum value may include information on one of the maximum value and the minimum value and information on a difference between the maximum value and the minimum value.

In the image encoding method according to the present invention, when the SAO mode for the current block is a band offset (BO) mode, the method may further include: determining an initial band point associated with a start position of a band section to which the band offset is applied; determining M pieces of offset information for the band section to which the band offset is applied; and encoding the initial band point and the M pieces of offset information, wherein the M is determined on the basis of the initial band point and at least one of the minimum value and the maximum value.

In the image encoding method according to the present invention, when the SAO mode for the current block is a band offset mode, the method may further include: re-dividing a section between the maximum value and the minimum value into 32 bands, wherein an initial band point associated with a start position of a band section to which the band offset is applied is a point for the 32 bands obtained by the re-division.

An image decoding device according to the present invention includes a decoder decoding information associated with a clipping range of a current block; and a filtering unit performing sample adaptive offset (SAO) filtering on the basis of the information associated with the clipping range, wherein the information associated with the clipping range includes information on a maximum value and a minimum value of a pixel value included in the current block.

An image encoding device according to the present invention includes an encoding unit determining a clipping range of a current block and encoding information associated with the clipping range; and a filtering unit performing sample adaptive offset (SAO) filtering on the basis of the clipping range, wherein the information associated with the clipping range includes information on a maximum value and a minimum value of a pixel value included in the current block.

According to another aspect of the present invention, there is provided an image decoding method including: decoding clipping band index information for a current block; and performing sample adaptive offset (SAO) filtering on the basis of the clipping band index information, wherein the clipping band index information may be information indicating a clipping band including a maximum value and a minimum value of a pixel value included in the current block.

In the image decoding method according to the present invention, the clipping band index information for the current block may be transmitted in units of the current block or an arbitrary region including the current block.

In the image decoding method according to the present invention, the arbitrary region unit may include at least one of a picture unit, a tile unit, and a slice unit.

In the image decoding method according to the present invention, the clipping band includes N sections obtained by dividing a range of the maximum pixel value to the minimum pixel value into N sections, and the clipping band index information may be information indicating one of the N sections.

In the image decoding method according to the present invention, when the maximum value and the minimum value of the pixels included in the current block are included in the same band, the clipping band index information may be information indicating the same band.

In the image decoding method according to the present invention, when the maximum value and the minimum value of the pixel included in the current block are not included in the same band, the clipping band index information may include information indicating a band including the maximum value Information and information indicating the minimum value.

An image encoding method according to the present invention includes: determining a clipping range for a current block; determining a clipping band for the current block on the basis of the clipping range; performing a sample adaptive offset (SAO) filtering on the basis of the clipping band; and encoding clipping band index information, wherein the clipping band index information may be information indicating the clipping band including a maximum value and a minimum value of a pixel value included in the current block.

In the image encoding method according to the present invention, the clipping band index information for the current block may be encoded in units of the current block or an arbitrary region including the current block.

In the image encoding method according to the present invention, the arbitrary region unit may include at least one of a picture unit, a tile unit, and a slice unit.

In the image encoding method according to the present invention, the clipping band may include N sections obtained by dividing a range of the maximum pixel value to the minimum pixel value into N sections, and the clipping band index information may be information indicating one of the N sections.

In the image encoding method according to the present invention, when the maximum value and the minimum value of the pixel included in the current block are included in the same band, the clipping band index information may be information indicating the same band.

In the image encoding method according to the present invention, when the maximum value and the minimum value of the pixels included in the current block are not included in the same band, the clipping band index may include information indicating a band including the maximum value and information indicating the minimum value.

An image decoding device according to the present invention includes a decoding unit decoding clipping band index information for a current block; and a filtering unit performing sample adaptive offset (SAO) filtering on the basis of the clipping band index information, wherein the clipping band index information may be information indicating a clipping band including a maximum value and a minimum value of a pixel value included in the current block.

An image encoding device according to the present invention includes: an encoding unit determining a clipping range for a current block, determining a clipping band for the current block on the basis of the clipping range, and encoding the clipping band index information; and a filtering unit performing sample adaptive offset (SAO) filtering on the basis of the clipping band, wherein the clipping band index information may be information indicating a clipping band including a maximum value and a minimum value of a pixel value included in the current block.

The computer-readable recording medium according to the present invention may store a bitstream generated by the image encoding method or the image encoding device according to the present invention.

Advantageous Effects

According to the present invention, an image encoding/decoding method and device capable of improving compression efficiency can be provided.

In addition, according to the present invention, an image encoding/decoding method and device capable of improving compression efficiency by using a pixel range for an arbitrary image region can be provided.

Also, according to the present invention, there can be provided a computer readable recording medium storing a bitstream generated by a video encoding method or a video encoding device according to the present invention.

MODE FOR INVENTION

Figure 1:
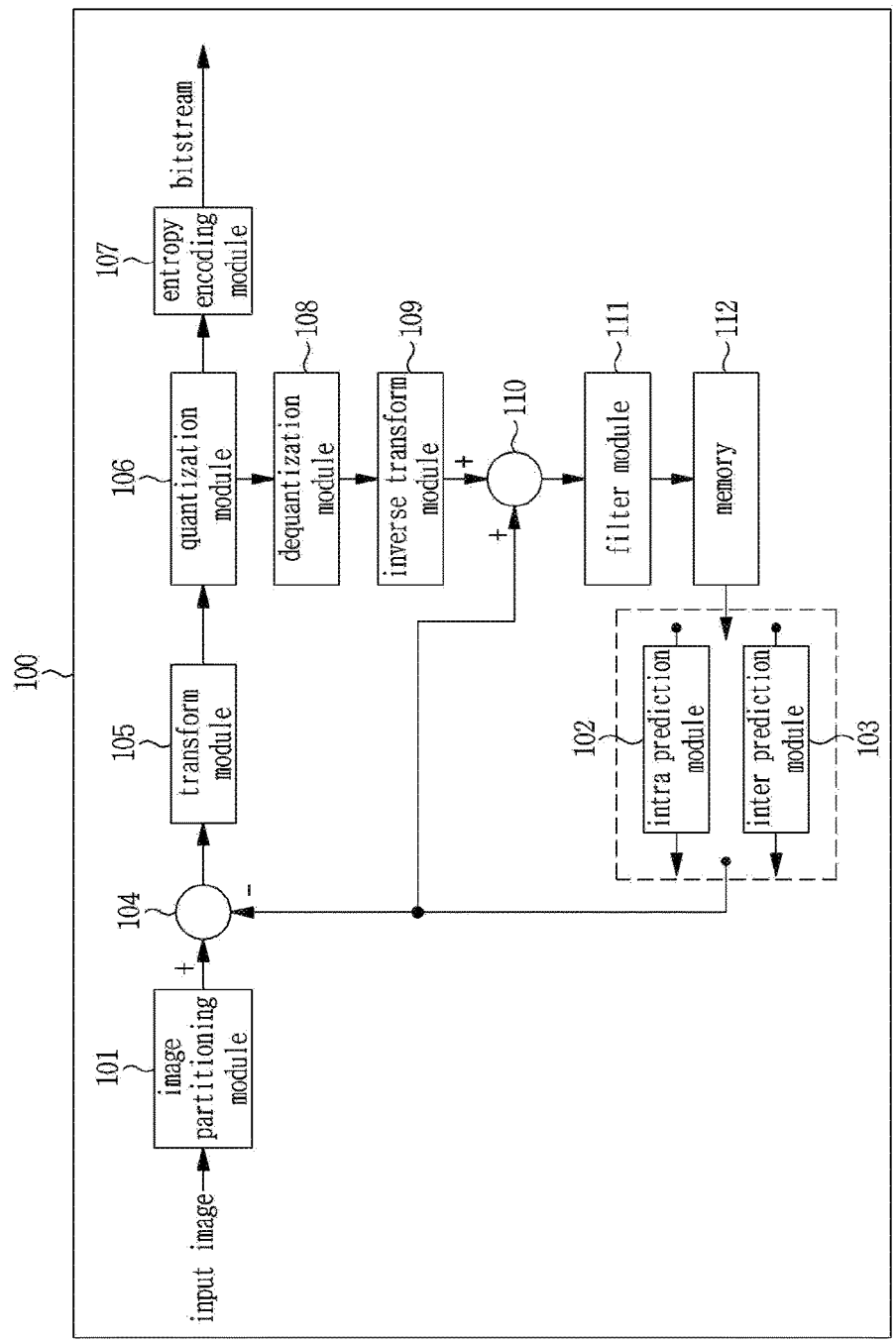
FIG. 1 is a block diagram illustrating an image encoding device according to an embodiment of the present invention.

While various modifications and alternative forms of the invention are possible, specific embodiments thereof are shown by way of example in the drawings and will herein be described in detail. It should be understood, however, that the invention is not intended to be limited to the particular embodiments, but includes all modifications, equivalents, and alternatives falling within the spirit and scope of the invention. Like reference numerals are used for like elements in describing each drawing.

The terms first, second, etc. can be used to describe various components, but the components should not be limited by the terms. The terms are used only for the purpose of distinguishing one component from another. For example, without departing from the scope of the present invention, the first component can be referred to as a second component, and similarly, the second component can also be referred to as a first component. A term and/or includes any combination of a plurality of related listed items or any one of a plurality of related listed items.

It will be understood that when any element is referred to as being "connected" or "coupled" to another element, one element may be directly connected or coupled to the other element, or an intervening element may be present therebetween. In contrast, it should be understood that when an element is referred to as being "directly coupled" or "directly connected" to another element, there are no intervening elements present.

The terminology used herein is for the purpose of describing particular embodiments only and is not intended to be limiting. As used herein, the singular forms "a", "an", and "the" are intended to include the plural forms as well unless the context clearly indicates otherwise. It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof.

Hereinafter, embodiments of the present invention will be described in detail with reference to the accompanying drawings. Hereinafter, the same reference numerals will be used for the same constituent elements in the drawings, and redundant explanations for the same constituent elements will be omitted.

FIG. 1 is a block diagram illustrating an image encoding device according to an embodiment of the present invention.

Referring to FIG. 1, an image encoding device 100 includes an image partitioning module 101, an intra prediction module 102, an inter prediction module 103, a subtractor 104, a transform module 105, a quantization module 106, an entropy encoding module 107, an dequantization module 108, an inverse transform module 109, an adder 110, a filter module 111, and a memory 112.

The components shown in FIG. 1 are shown independently to represent different characteristic functions in the image encoding device, and do not mean that each of the components is composed of separate hardware or one software configuration unit. That is, each component is included in each component for convenience of explanation, and at least two components of the components may be combined to form one component, or one component may be divided into a plurality of components to perform functions. The integrated embodiments and separate embodiments of the components are also included within the scope of the present invention, unless they depart from the essence of the present invention.

In addition, some of the components are not essential components that perform essential functions in the present invention, but may be optional components only to improve performance. The present invention may be implemented with only components essential for realizing the essence of the present invention, except for the components used for the performance improvement, and can be implemented by only including the essential components except the optional components used for performance improvement.

The image partitioning module 100 may divide the input image into at least one block. Herein, the input image may have various types and sizes such as a picture, a slice, a tile, and a segment. A block may mean a coding unit (CU), a prediction unit (PU), or a transform unit (TU). The partitioning may be performed on the basis of at least one of a quadtree or a binary tree. The quadtree is a method of splitting the parent block into child blocks that are half of the parent block in width and height. A binary tree is a method of splitting a parent block into child blocks either width or height of which is half of the parent block. Through the binary tree-based partitioning described above, the block may have a type of a square as well as a non-square.

Hereinafter, in the embodiment of the present invention, a coding unit may be used as a unit for performing coding, or may be used as a unit for performing decoding.

Prediction units 102 and 103 may include an inter prediction module 103 for performing inter prediction and an intra prediction module 102 for performing intra prediction. It is possible to determine whether inter prediction or intra prediction is to be performed for the prediction unit, and to determine specific information (e.g., intra prediction mode, motion vector, reference picture, etc.) according to each prediction method. Herein, the processing unit in which the prediction is performed may be different from the processing unit in which the prediction method and the specific contents are determined. For example, the prediction method and the prediction mode may be determined as a prediction unit, and the prediction may be performed as a transform unit.

The residual value (residual block) between the generated prediction block and the original block may be input to the transform module 105. In addition, the prediction mode information and the motion vector information used for the prediction may be encoded in the entropy encoding module 107 along with the residual value and transmitted to the decoder. When a specific encoding mode is used, a prediction block is not generated through the prediction modules 102 and 103, but the original block is encoded as it is and then transmitted to the decoding module.

The intra prediction module 102 may generate a prediction block on the basis of reference pixel information around the current block, which is pixel information in the current picture. When the prediction mode of the neighboring block of the current block on which intra prediction is to be performed is inter prediction, a reference pixel included in a neighboring block to which inter prediction is applied may be replaced with a reference pixel in another neighboring block to which intra prediction is applied. In other words, when a reference pixel is not available, the reference pixel information that is not available may be replaced with at least one reference pixel among the available reference pixels.

In the intra prediction, the prediction mode may have a directional prediction mode in which the reference pixel information is used according to the prediction direction and a non-directional mode in which the directional information is not used when performing the prediction. The mode for predicting luma information may be different from the mode for predicting chroma information, and intra prediction mode information or predicted luma signal information used for predicting luma information may be used, in order to predict chroma information.

The intra prediction module 102 may include an adaptive intra smoothing (AIS) filter, a reference pixel interpolator, and a DC filter. The AIS filter is a filter that performs filtering on the reference pixels of the current block and may adaptively determine whether to apply the filter according to the prediction mode of the current prediction unit. When the prediction mode of the current block does not perform AIS filtering, the AIS filter may not be applied.

The reference pixel interpolation unit of the intra prediction module 102 interpolates reference pixels to generate a reference pixel at fractional sample position, in the case of prediction unit in which the prediction mode of the prediction unit performs intra prediction on the basis of the pixel value obtained by interpolating the reference pixels. In the case of the prediction mode in which the prediction mode of the current prediction unit generates a prediction block without interpolating the reference pixel, the reference pixel may not be interpolated. The DC filter may generate the prediction block via filtering when the prediction mode of the current block is DC mode.

A residual block including residual information, which is a difference value between the prediction unit generated in the prediction module 102, 103 and an original block of the prediction unit, may be generated. The generated residual block is input to the transform module 130 and then transformed.

The inter prediction module 103 may predict a prediction unit on the basis of information of at least one picture of a previous picture or a following picture of the current picture. In some cases, the prediction unit may be predicted on the basis of information of a partially region in which encoding is completed within the current picture. The inter prediction module 103 may include a reference picture interpolation unit, a motion prediction unit, and a motion compensation unit.

In the picture interpolation unit, reference picture information is provided from the memory 112, and pixel information of an integer pixel or less in the reference picture may be generated. In the case of a luma pixel, a DCT-based 8-tap interpolation filter having a different filter coefficient may be used to generate pixel information of an integer pixel or less on a per quarter-pixel basis. In the case of a chroma signal, a DCT-based 4-tap interpolation filter having a different filter coefficient may be used to generate pixel information of an integer pixel or less on a per ⅛-pixel basis.

The motion prediction module may perform motion prediction on the basis of a reference picture interpolated by a picture interpolation unit. Various methods such as full search-based block matching algorithm (FBMA), three step search (TSS), and new three-step search algorithm (NTS) may be used as methods for calculating the motion vector. The motion vector may have a motion vector value of ½ or ¼ pixel unit on the basis of the interpolated pixel. The motion prediction module may predict the current prediction unit by making the motion prediction methods different. Various methods such as a skip method, a merge method, and an advanced motion vector prediction (AMVP) method may be used as the motion prediction method. The subtractor 104 generates a residual block of the current block by subtracting the prediction block generated by the intra prediction module 102 or the inter prediction module 103 from the current block to be encoded.

The transform module 105 may generate a transform block by transforming a residual block, which is a difference between an original block and a prediction block. The transform block may be the smallest unit in which the transform and quantization processes are performed. The transform module 105 may transform the residual signal into the frequency domain to generate a transform block including the transform coefficients. A transform method such as discrete cosine transform (DCT), discrete sine transform (DST) or Karhunen-Loeve transform (KLT) may be used to transform the residual block including the residual data into the frequency domain. The transform coefficients may be generated by transforming the residual signal into the frequency domain using the transform method. Matrix operations using a basis vector may be performed in order to make it easy to perform transformation. Depending on the prediction mode in which the prediction block is encoded, various transform methods may be used in matrix operation. For example, the transform method may be determined on the basis of the intra prediction mode of the prediction unit used to generate the residual block. For example, according to the intra prediction mode, DCT may be used in the horizontal direction, and DST may be used in the vertical direction.

The quantization module 106 may quantize values transformed into frequency domain by the transform module 105. That is, the quantization module 106 may quantize the transform coefficients of the transform block generated from the transform module 105 to generate a quantized transform block having the quantized transform coefficients. As the quantization method, dead zone uniform threshold quantization (DZUTQ), a quantization weighted matrix, or the like may be used. Alternatively, various quantization methods such as a quantization method improving the same may be used. The quantization factor may vary depending on the block or the importance of the image. The values calculated in the quantization module 106 may be provided to the dequantization module 108 and the entropy encoding module 107.

The transform module 105 and/or the quantization module 106 may be selectively included in the image encoding device 100. That is, the image encoding device 100 may perform at least one of transformation or quantization or may skip both the transformation and the quantization on the residual data of the residual block, thereby encoding the residual block. Even when any one of transformation and quantization is not performed, or both transformation and quantization are not performed, in the image encoding device 100, a block entering an input of the entropy encoding module 107 is generally referred to as a transform block.

The entropy encoding module 107 entropy-codes the input data. The entropy encoding module 107 may encode the quantized transform block to output a bitstream. That is, the entropy encoding module 107 may encode the quantized transform coefficients of the quantized transform block output from the quantization module 106 using various encoding techniques such as entropy encoding. In addition, the entropy encoding module 107 may encode additional information (e.g., information on a prediction mode, a quantization coefficient, and the like) required for decoding the corresponding block in an image decoding device to be described below. For entropy encoding, various encoding methods such as exponential Golomb, context-adaptive variable length coding (CAVLC), and context-adaptive binary arithmetic coding (CABAC) may be used.

The entropy encoding module 107 may encode a variety of information, such as residual value coefficient information, block type information, prediction mode information, division unit information, prediction unit information, transmission unit information, motion vector information, reference frame information, block interpolation information, prediction unit information, and filtering information of the coding unit from the prediction modules 102 and 103. In the entropy encoding module 107, the coefficients in a transform block may be decoded on a per sub-block basis in the transform block, in which the decoding is performed using various flags representing a coefficient other than zero, a coefficient having the absolute value greater than 1 or 2, a sign of each coefficient, etc. A coefficient that is not encoded only by a flag may be encoded through the absolute value of a difference between the coefficient encoded through the flag and the coefficient of the actual transform block. The dequantization module 108 and the inverse transform module 109 dequantize the values quantized by the quantization module 106 and invert the values transformed by the transform module 105, respectively. The residual value (Residual) generated by the dequantization module 108 and the inverse transform module 109 is added to the prediction unit predicted through the motion prediction unit and the motion compensation unit included in the prediction modules 102 and 103, and the intra prediction module 102, thereby generating a reconstructed block. The adder 110 generates a reconstructed block by adding the prediction blocks generated by the prediction modules 102 and 103 and the residual blocks generated by the inverse transform module 109.

The filter module 111 may include at least one of a deblocking filter, an offset correction unit, and an adaptive loop filter (ALF).

The deblocking filter removes block artifacts caused by the boundary between blocks within a reconstructed picture. In order to determine whether to perform deblocking, it is possible to determine whether to perform deblocking on the current block on the basis of pixels included in several rows and columns included in the block. When performing deblocking on the block, a strong filter or a weak filter may be applied according to a deblocking filtering strength required. When performing horizontal filtering and vertical filtering by applying a deblocking filter, the vertical filtering and the horizontal filtering may be performed in parallel.

The offset correction unit may correct the offset with respect to the original image on a per pixel basis for the image on which the deblocking is performed. In order to perform offset correction for a specific picture, a method (band offset mode, BO mode) of dividing a pixel included in an image into a predetermined number of regions, determining a region to which the offset is performed, and then applying the offset to the corresponding region, or a method (edge offset mode, BO mode) of applying an offset in consideration of edge information of a pixel may be used.

The adaptive loop filtering (ALF) is performed on the basis of the results of comparison between the filtered reconstructed picture and the original picture. Pixels included in an image picture may be divided into a plurality of pixel groups, and filtering may be differently performed on each pixel group by determining one filer to be applied for each pixel group. In the case of a luma signal, information indicating whether to apply the ALF may be transmitted on a per-coding unit (CU) basis. The shape and the filter coefficient of the ALF filter to be used may differ block by block. In addition, the same type (fixed type) of ALF filter may be used, regardless of the characteristics of target blocks to be filtered.

The memory 112 may store the reconstructed block or picture calculated through the filter module 111 and the stored reconstructed block or picture may be provided to the prediction module 102 or 103 when the inter prediction is performed.

The intra prediction module 102 and the inter prediction module 103 may be collectively referred to as a prediction module. The prediction module may generate a prediction block using the neighboring pixels of the current block or the reference picture that has been previously decoded. The prediction block may generate one or more prediction blocks in the current block. When there is only one prediction block in the current block, the prediction block may have the same type as the current block. When the prediction block is generated, a residual block corresponding to a difference between the current block and the prediction block may be generated. By applying various techniques such as rate-distortion optimization (RDO) to the generated residual block, the optimal prediction mode may be determined. For example, the following equation 1 may be used for the calculation of RDO.

$$J(\emptyset,\lambda)=D(\emptyset)+\lambda R(\emptyset) \quad [\text{Equation 1}]$$

In the Equation 1, D( ), R( ) and J( ) are deterioration attributable to quantization, a rate of compression stream, and an RD cost, respectively. φ means coding mode. λ is a Lagranginan multiplier which is a scale correction coefficient for matching the units of error rate and bit rate. In order for a certain mode to be selected as the optimal coding mode in the encoding process, when the corresponding mode is applied, J( ) that is, RD cost, needs to be smaller than when the other modes are applied. The equation for calculating a RD cost value takes account of both a bit rate and an error rate.

Figure 2:
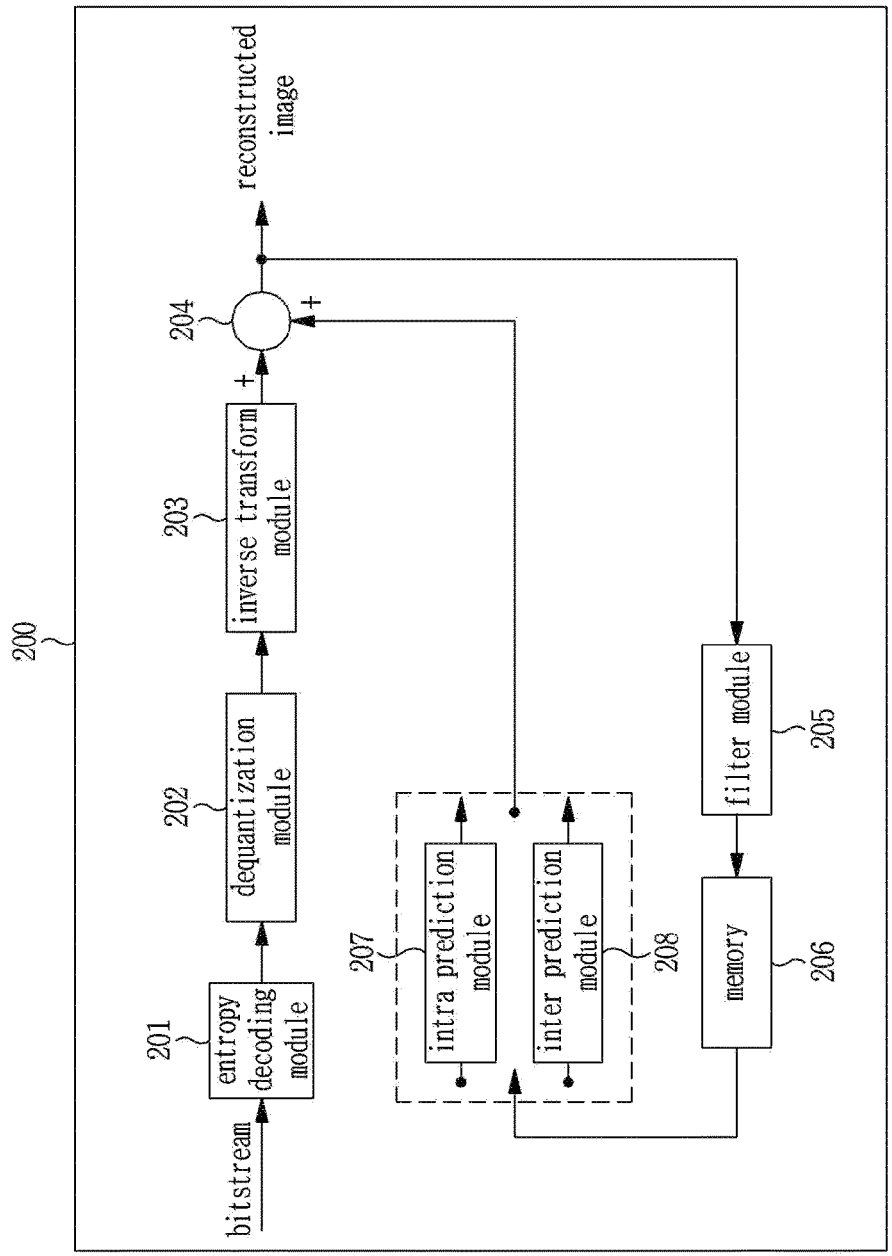
FIG. 2 is a block diagram illustrating an image decoding device according to an embodiment of the present invention.

FIG. 2 is a block diagram illustrating an image decoding device according to an embodiment of the present invention.

Referring to FIG. 2, the image decoding device 200 includes an entropy decoding module 201, a dequantization module 202, an inverse transform module 203, an adder 204, a filter module 205, a memory 206, and prediction modules 207 and 208.

When the image bitstream generated by the image encoding device 100 is input to the image decoding device 200, the input bitstream is decoded in accordance with a process opposite to that performed by the image encoding device 100.

The entropy decoding module 201 performs entropy decoding which is reverse in procedure to the entropy encoding performed by the entropy encoding module 105 of the image encoding device 100. For example, various methods such as exponential-Golomb, context-adaptive variable length coding (CAVLC), and context-adaptive binary arithmetic coding (CABAC) may be used depending on the encoding method used in the image encoder. In the entropy decoding module 201, the coefficients in a transform block may be decoded on a per sub-block basis in the transform block, in which the decoding may be performed using various flags representing a coefficient other than zero, a coefficient having the absolute value greater than 1 or 2, a sign of each coefficient, etc. A coefficient that may not be represented only by a flag is decoded by summing a coefficient represented by a flag and a signaled coefficient.

The entropy decoding module 201 may decode information associated with intra prediction and inter prediction performed in the encoder.

The dequantization module 202 dequantizes the quantized transform block to generate a transform block and operates substantially in the same way as the dequantization module of FIG. 1.

The inverse transform module 203 performs inverse transform on the transform block to generate a residual block. Herein, the transform method may be determined on the basis of information on a prediction method (inter or intra prediction), a size and/or type of block, and intra prediction mode. The inverse transform module 203 operates substantially in the same way as the inverse transform module 109 of FIG. 1.

The adder 204 adds the prediction block generated by the intra prediction module 207 and the inter prediction module 208 and the residual block generated by the inverse transform module 1004, thereby generating a reconstructed block. The adder 1005 operates substantially in the same way as the adder 110 of FIG. 1.

The filter module 205 reduces various types of noise occurring in the reconstructed blocks.

The filter module 205 may include a deblocking filter, an offset correction unit, and an ALF.

Information on whether or not a deblocking filter has been applied to the corresponding block or picture is received from the image encoding device 100. When a deblocking filter is applied, information on whether a strong filter is applied or a weak filter is applied is received from the image encoding device 100. The deblocking filter of the image decoding device 200 receives deblocking filter related information provided from the image encoding device 100, and performs deblocking filtering on the corresponding block in the image decoding device 200.

The offset correction unit may perform offset correction of the reconstructed image on the basis of a type of offset correction and offset value information applied to the image at the time of encoding.

The ALF may be applied to an encoding unit on the basis of information on whether ALF is applied or not, ALF coefficient information, and the like provided from the image encoding device 100. Such ALF information may be included in a specific set of parameters. The filter module 205 operates substantially in the same way as the filter module 111 of FIG. 1.

The memory 206 stores the reconstructed block generated by the adder 204 and operates substantially in the same way as the memory 112 of FIG. 1.

The prediction modules 207 and 208 may generate a prediction block on the basis of the prediction block generation related information provided by the entropy decoding module 201 and the previously decoded block or picture information provided from the memory 206.

The prediction modules 207 and 208 may include an intra prediction module 207 and an inter prediction module 208. Although not shown separately, the prediction modules 207 and 208 may further include a prediction unit discriminator. The prediction unit discriminator receives various information such as prediction unit information input from the entropy decoding module 201, prediction mode information of the intra prediction method, and motion prediction related information of the inter prediction method, discriminates prediction units in the current encoding unit, and determines whether the prediction unit performs inter prediction or intra prediction. The inter prediction module 208 uses information necessary for inter prediction of the current prediction unit provided by the image encoding device 100 to perform inter prediction for the current prediction unit on the basis of information included in at least one of a previous picture or a following picture of the current picture including the current prediction unit. Alternatively, inter prediction may be performed on the basis of the information of the partial region that is previously reconstructed within the current picture including the current prediction unit.

In order to perform inter prediction, it is possible to determine whether a motion prediction method of a prediction unit included in the corresponding coding unit on the basis of a coding unit is any one mode among a skip mode, a merge mode, or an AMVP mode.

The intra prediction module 207 generates a prediction block using pixels that are located around the block to be currently coded and are previously reconstructed.

The intra prediction module 207 may include an adaptive intra smoothing (AIS) filter, a reference pixel interpolation unit, and a DC filter. The AIS filter is a filter that performs filtering on the reference pixels of the current block and may adaptively determine whether to apply the filter according to the prediction mode of the current prediction unit. The AIS filtering may be performed on the reference pixel of the current block using the prediction mode of the prediction unit provided by the image encoding device 100 and the AIS filter information. When the prediction mode of the current block is a mode that does not perform AIS filtering, the AIS filter may not be applied.

When the prediction mode of the prediction unit is a prediction unit that performs intra prediction on the basis of a pixel value obtained by interpolating a reference pixel, the reference pixel interpolation unit of the intra prediction module 207 interpolates the reference pixel to generate the reference pixel at fractional sample position. The generated reference pixel at the fractional sample position may be used as a prediction pixel of the pixel in the current block. When the prediction mode of the current prediction unit is a mode that generates the prediction block without interpolating the reference pixel, the reference pixel may not be interpolated. The DC filter may generate the prediction block via filtering when the prediction mode of the current block is a DC mode.

The intra prediction module 207 operates substantially in the same way as the intra prediction module 102 of FIG. 1.

The inter prediction module 208 generates an inter prediction block using the reference picture and the motion information stored in the memory 206. The inter prediction module 208 operates substantially in the same way as the inter prediction module 103 of FIG. 1.

Figure 3:
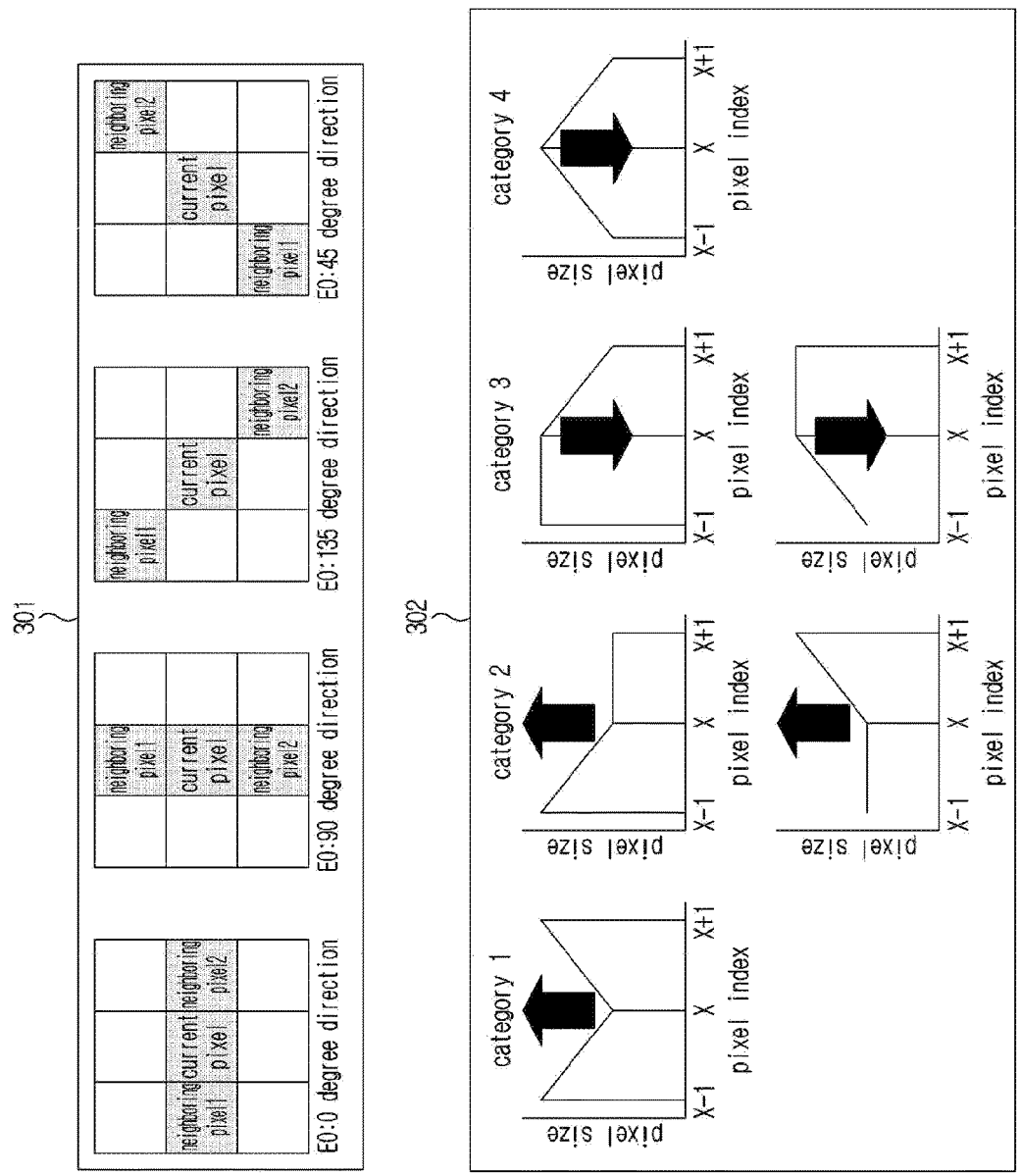
FIG. 3 is a diagram illustrating an edge offset (EO) mode.
Figure 4:
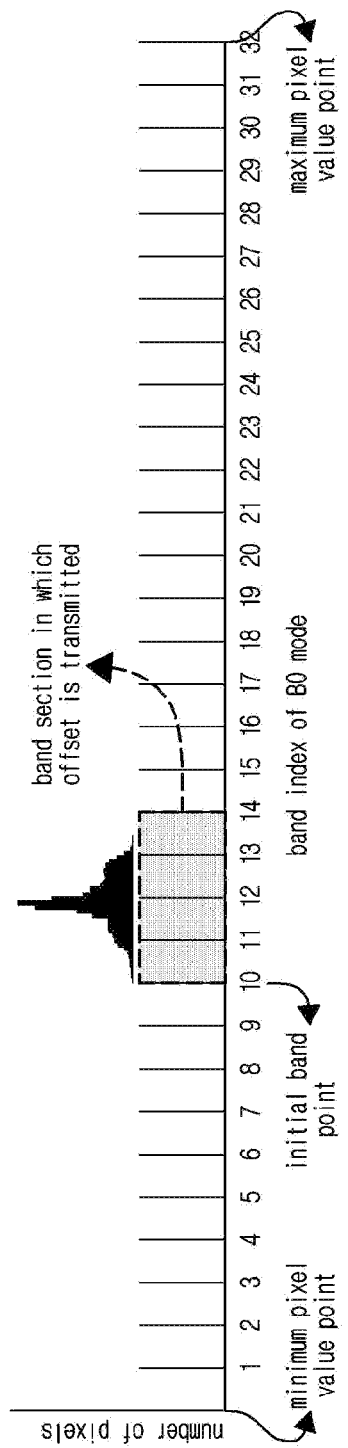
FIG. 4 is a diagram illustrating a band offset (BO) mode.

Referring to FIGS. 3 and 4, sample adaptive offset (SAO) compensation filtering will be described.

FIG. 3 is a diagram illustrating an edge offset (EO) mode.

As shown in an upper box 301 of FIG. 3, the boundary direction between adjacent pixels around the current pixel may be classified into one of four directions information of 0, 45, 90, and 135 degrees. Also, on the basis of the difference in pixel values between the current pixel and the adjacent pixels, the boundary direction may be classified into one of four categories as shown in a lower box 302 in FIG. 3. A pixel index x−1 in each category of a lower box 302 in FIG. 3 means the neighboring pixel 1 in each direction of the upper box 301. Similarly, a pixel index x means the current pixel, and a pixel index x+1 means the neighboring pixel 2. The sign of the offset to be applied to the current pixel in each category is already predetermined. For example, the signs of the offsets of category 1 and category 2 are plus (+), and the signs of the offsets of category 3 and category 4 are minus (−).

The filtering may be performed by finding, among four categories, a type according to a difference of pixel value between each current pixel and neighboring pixels in an optimal direction among four directions and adding the offset value in the corresponding category for each current pixel. When a type according to the difference of the pixel value between the current pixel and the neighboring pixels does not fall within four categories shown in FIG. 3, the filtering may not be performed on the current pixel.

FIG. 4 is a diagram illustrating a band offset (BO) mode.

In the BO mode, a range of pixels (for example, a pixel range of 0 to 255 in the case of an 8-bit image) is divided into 32 bands according to the bit depth of the input image, and four consecutive bands which are subject to band offset are determined. When the current pixel value belongs to four consecutive bands, the filtering may be performed by adding the offset value for the corresponding band to the current pixel value.

In the example shown in FIG. 4, a pixel range according to a bit depth of an input image is divided into 32 bands, and bands Nos. 10 to 13 are determined as band offset targets. When the pixel value of the current pixel belongs to one of the bands Nos. 10 to 13, the filtering may be performed by adding the offset value for the band to the pixel value of the current pixel.

Figure 5:
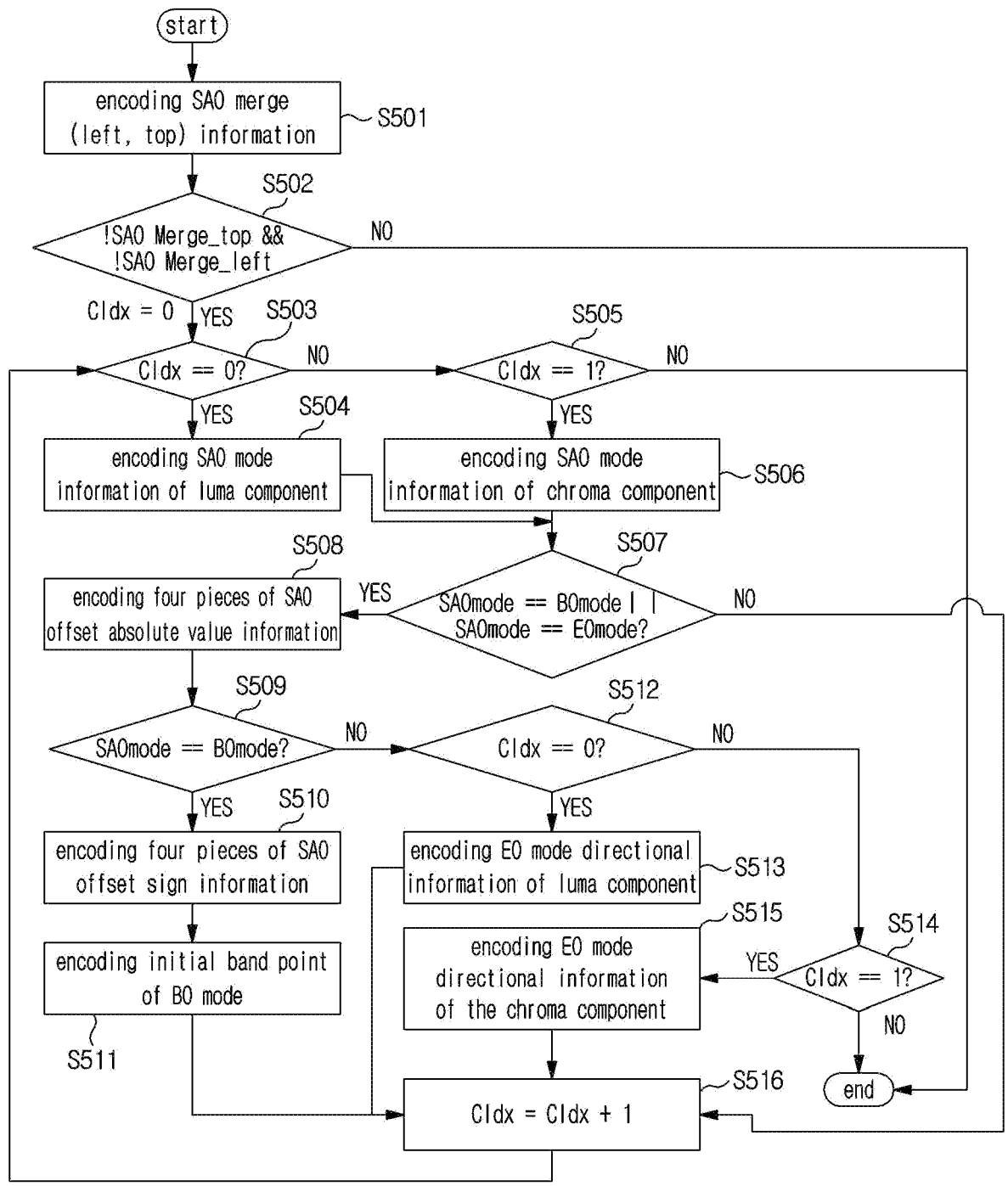
FIG. 5 is a diagram illustrating a method of encoding SAO information in an image encoding device 100.

FIG. 5 is a diagram illustrating a method of encoding SAO information in an image encoding device 100.

In step S501 information (SAO merge information) is encoded on whether or not the SAO information of the left coding block and/or the top coding block is used as it is on the basis of a coding block (current block) in which SAO is performed. First, the SAO Merge_left information is encoded. When the information is true, the SAO Merge_top information is not encoded, and the process moves to step S502. When the SAO Merge_left information is false, the SAO Merge_top information is encoded, and the process moves to step S502.

In step S502, it is determined whether the SAO Merge_left information and the SAO Merge_top information are both false or not. When two pieces of information are both false, the process proceeds to step S503. When any of the two pieces of information is true, the process ends.

In step S503, the information CIdx is set to an initial value of zero. When CIdx is 0, it means luma component. When CIdx is 1, it means chroma Cb component, and when CIdx is 2, it means chroma Cr component. In step S503, it is determined whether CIdx is 0 or not. When the CIdx is 0, the process proceeds to step S504, and otherwise, the process proceeds to step S505.

In step S504, the SAO mode information of the luma component is encoded. The SAO mode information may be information about whether any one mode of mode, EO mode, BO mode, and SAO non-operation mode is to be performed for the current block.

In step S505, it is determined whether CIdx is 1 or not. When the CIdx is 1, the process proceeds to step S506, and otherwise, the process is terminated.

In step S506, the SAO mode information of the chroma component is encoded. The SAO mode information may be information on whether any one mode of EO mode, BO mode, and SAO non-operation mode is to be performed for the current block. Here, the Cb and Cr components of the chroma component may all share the same SAO mode information.

In step S507, when the SAO mode for the current block is the SAO non-operation mode, the process moves to step S516. When the SAO mode for the current block is the BO mode or the EO mode, the process moves to step S508.

In step S508, four pieces of offset absolute value information are encoded. In the case of the EO mode, four offsets represent offsets for each category, and in the case of the BO mode, four offsets represent offsets of each of four consecutive bands.

In step S509, it is determined whether or not the SAO mode for the current block is the BO mode. When it is determined BO mode, the process proceeds to step S510. When it is determined not BO mode, the process proceeds to step S512.

In step S510, sign information of four offsets of the BO mode is encoded.

In step S511, an initial band point indicating where four consecutive bands section of the BO mode start is encoded.

In step S512, it is determined whether CIdx is 0 or not. When it is 0, the process proceeds to step S513. Otherwise, the process proceeds to step S514.

In step S513, directional information of the BO mode of the luma component is encoded.

In step S514, it is determined whether CIdx is 1 or not. When CIdx is not 1, the process is terminated. When the CIdx is 1, the process proceeds to step S515.

In step S515, directional information of the BO mode of the chroma component is encoded. Here, both the Cb and Cr components of the chroma component share the same directional information.

In step S516, the current CIdx value is incremented by one, and the process moves to step S503 to repeat the above-described process.

Figure 6:
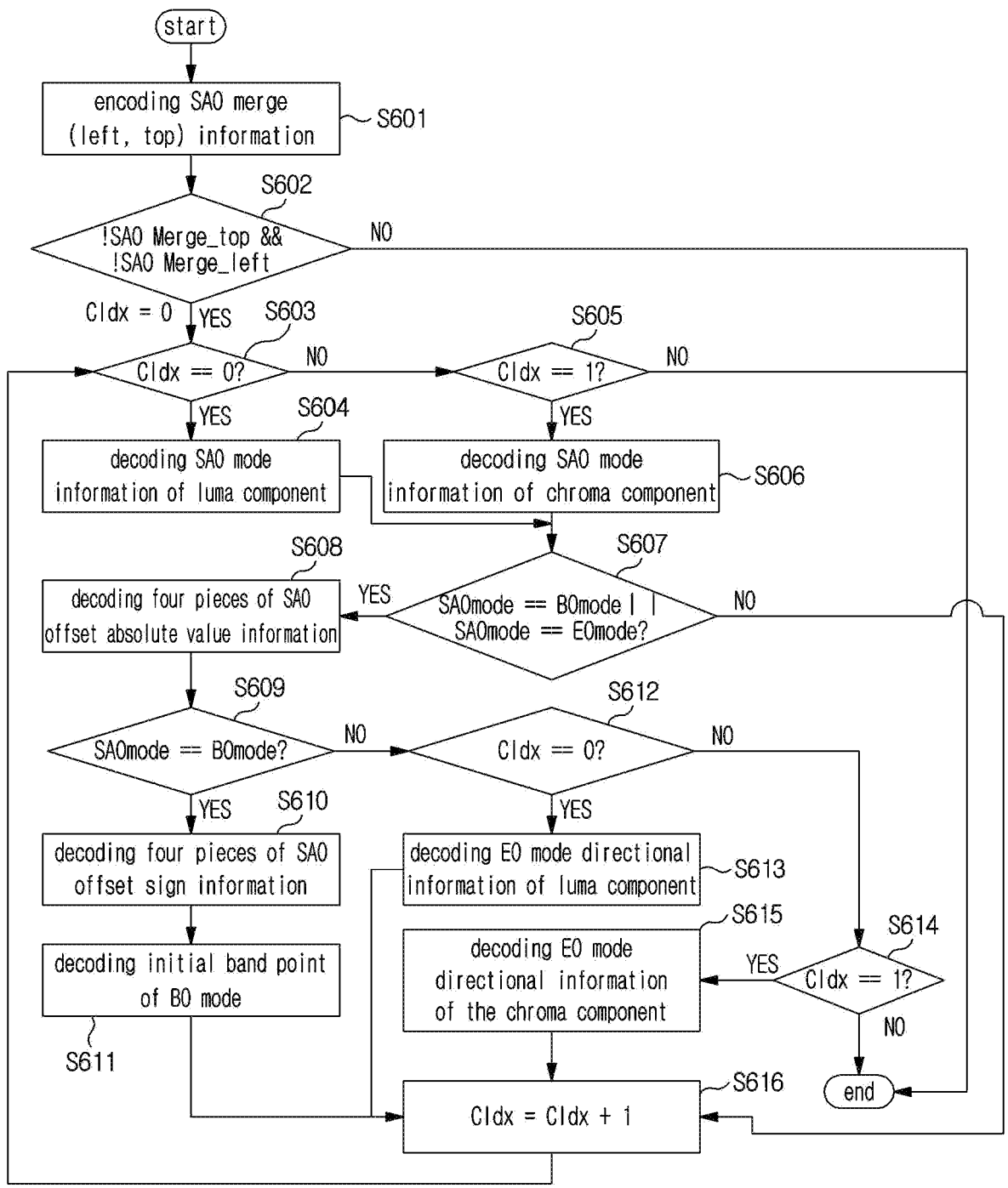
FIG. 6 is a diagram illustrating a method of decoding SAO information in an image decoding device 200.

FIG. 6 is a diagram illustrating a method of decoding SAO information in an image decoding device 200.

In step S601, the SAO merge information encoded in step S501 of FIG. 5 is decoded.

In step S602, it is determined whether the SAO Merge_top and the SAO Merge_left information are both false or not. When both pieces of information are both false, the process goes to step S603, and when even any one of them is true, the process ends.

In step S603, the CIdx value is initialized to 0, and it is determined whether the corresponding CIdx value is 0 or not. When the CIdx value is 0, the process proceeds to step S604. When the CIdx value is not 0, the process proceeds to step S605.

In step S604, the SAO mode information of the luma component encoded in step S504 of FIG. 5 is decoded.

In step S605, it is determined whether the CIdx is 1 or not. When the CIdx is 1, the process proceeds to step S606, and otherwise, the process is terminated.

In step S606, the SAO mode information of the chroma component encoded in step S506 of FIG. 5 is decoded. Here, the Cb and Cr components of the chroma component may all share the same SAO mode information.

In step S607, when the SAO mode for the current block is the SAO non-operation mode, the process moves to step S616. When the SAO mode for the current block is the BO mode or the EO mode, the process moves to step S608.

In step S608, the four pieces of offset absolute value information encoded in step S508 of FIG. 5 are decoded.

In step S609, it is determined whether the SAO mode for the current block is the BO mode or not. When the SAO mode for the current block is the BO mode, the process proceeds to step S610. Otherwise, the process proceeds to step S612.

In step S610, the four pieces of offset sign information of the BO mode encoded in step S510 of FIG. 5 is decoded.

In step S611, the initial band point indicating where consecutive four band sections of the BO mode start, which is encoded in step S511 of FIG. 5, is decoded.

In step S612, it is determined whether CIdx is 0 or not. When CIdx is 0, the process proceeds to step S613, and otherwise, the process proceeds to step S614.

In step S613, the directional information of the EO mode of the luma component encoded in step S513 of FIG. 5 is decoded.

In step S614, it is determined whether the CIdx is 1 or not. When the CIdx is not 1, the process is terminated. When the CIdx is 1, the process proceeds to step S615.

In step S615, the directional information of the EO mode of the chroma component encoded in step S515 of FIG. 5 is decoded. Here, both the Cb and Cr components of the chroma component may share the same directional information.

In step S616, the current CIdx value is incremented by one, and the process proceeds to step S603 so that the above-described process is repeated.

In the following description, it is assumed that the bit depth of the input image is 8 bits.

Figure 7:
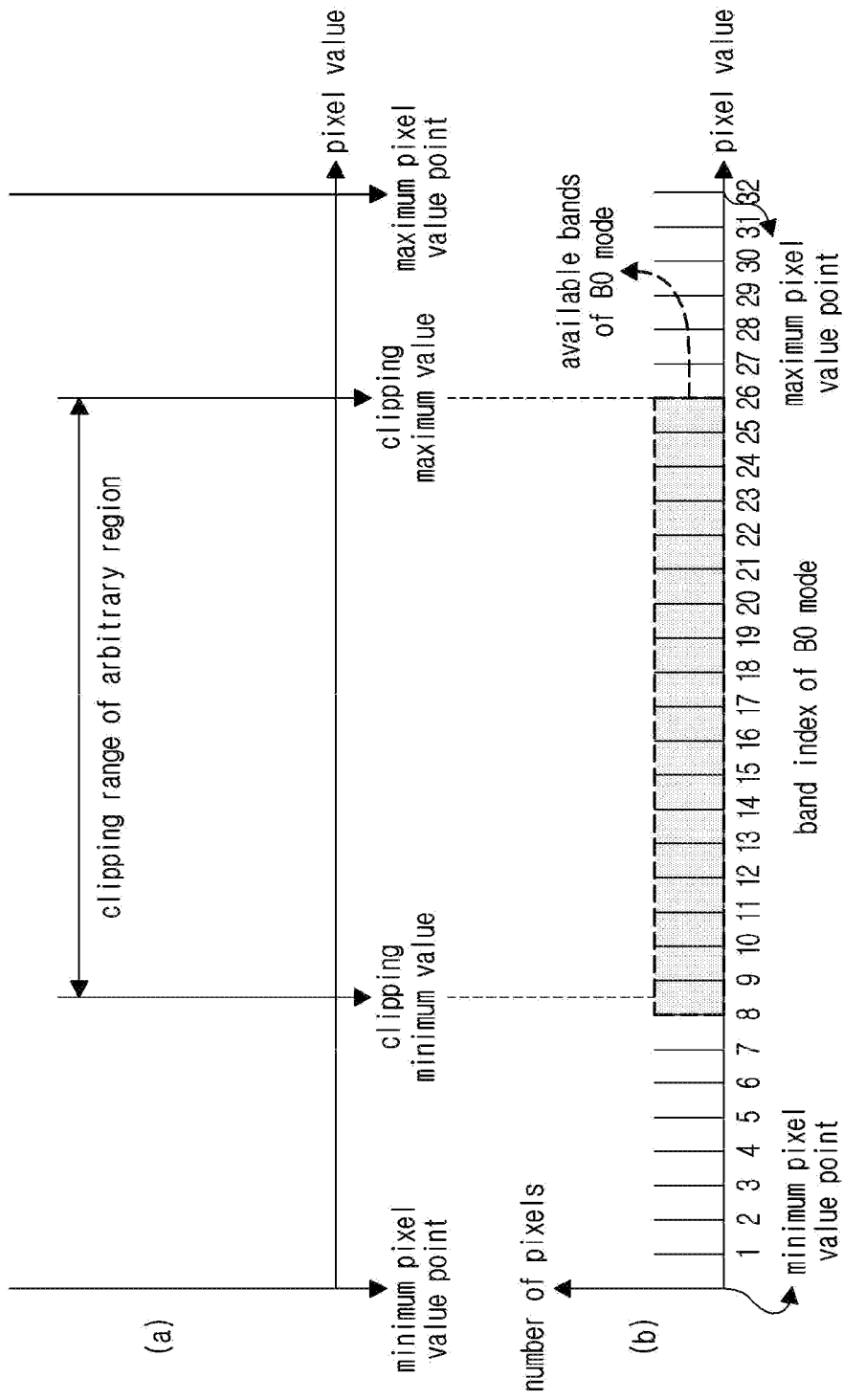
FIG. 7 is a diagram illustrating a clipping range in an arbitrary region and an available band of a BO mode.

FIG. 7 is a diagram illustrating a clipping range in any region and an available band of a BO mode.

The clipping range may be determined by searching for a maximum value and a minimum value of an original pixel in an arbitrary region unit such as a picture, a tile, a slice, or a block unit. The clipping range may be applied to the band section of the BO mode of SAO.

In FIG. 7, the minimum pixel value point is 0 and the maximum pixel value point is 255 for an input image having 8-bit depth. It is possible to scan the original pixel values in the corresponding region and then determine the maximum value and the minimum value of the pixel values included in the corresponding region, on a per-arbitrary region basis. As shown in FIG. 7 (a), the maximum value of the pixel value within an arbitrary region becomes the clipping maximum value, and the minimum value thereof becomes the clipping minimum value.

The clipping process may be performed after passing through the prediction module 102, 103, the adder 110, and/or the filter module 111 in the image encoding device 100. The clipping process may be performed after passing through the prediction module 207, 208, the adder 204, and/or the filter module 205 in the image decoding device 200.

In the SAO BO mode described above, the entire pixel section (0 to 255) is divided into 32 bands, and offset information of four consecutive bands to be filtered is used. Herein, when the clipping range is smaller than the entire pixel range, the filtering may be performed considering only the bands within the clipping range.

FIG. 7 (b) shows that the entire pixel section is divided into 32 bands. The bands that are shaded area correspond to the clipping range of the current region and represent a band section to which the BO mode may be applied.

In FIG. 7 (b), since no pixels exist in the current region belonging to the bands Nos. 1 to 8 and Nos. 27 to 32, the bands may not be considered as bands in the SAO BO mode. Also, when the maximum value and the minimum value within the clipping range are the same, the image may be reconstructed as the same value without passing through all the processes described with reference to FIGS. 1 and 2. When the difference between the maximum value and the minimum value within the clipping range is less than N (N is an integer equal to or greater than 0), any information such as an average values of the clipping maximum value and minimum value is used to reconstruct the image without passing through all the processes described referring to FIGS. 1 and 2. Here, the corresponding N value may be transmitted from a header of an upper level of the current region. When the available band section of the SAO BO mode has less than four bands, the number of transmitted offset values may be less than four.

Figure 8:
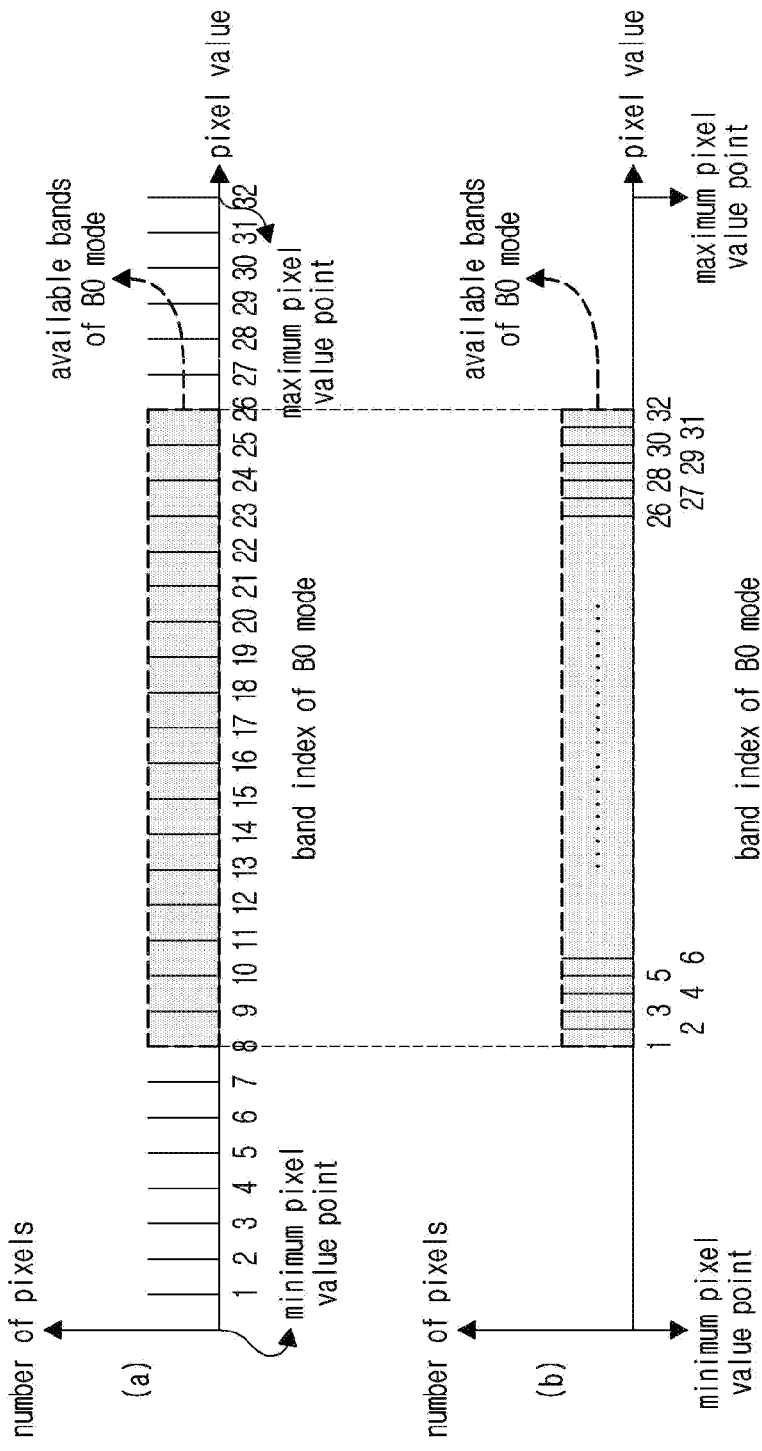
FIG. 8 is a diagram illustrating that an available band sections of the BO mode are further subdivided into 32 band sections.

FIG. 8 is a diagram illustrating that an available band section of the BO mode is further subdivided into 32 band sections.

As shown in FIG. 8 (a), when the bands of the BO mode corresponding to the clipping range in an arbitrary region is band No. 9 to band No. 26, the available band section (bands Nos. 9 to 26) may be further divided into 32 band sections as shown in FIG. 8 (b).

As shown in FIG. 8 (b), when encoding/decoding is performed by dividing an available band section into 32 band sections, it is possible to use the SAO information encoding and decoding algorithm described with reference to FIGS. 5 and 6. In this case, since the range of one band may be further subdivided, more precise band offset filtering may be realized.

Figure 9:
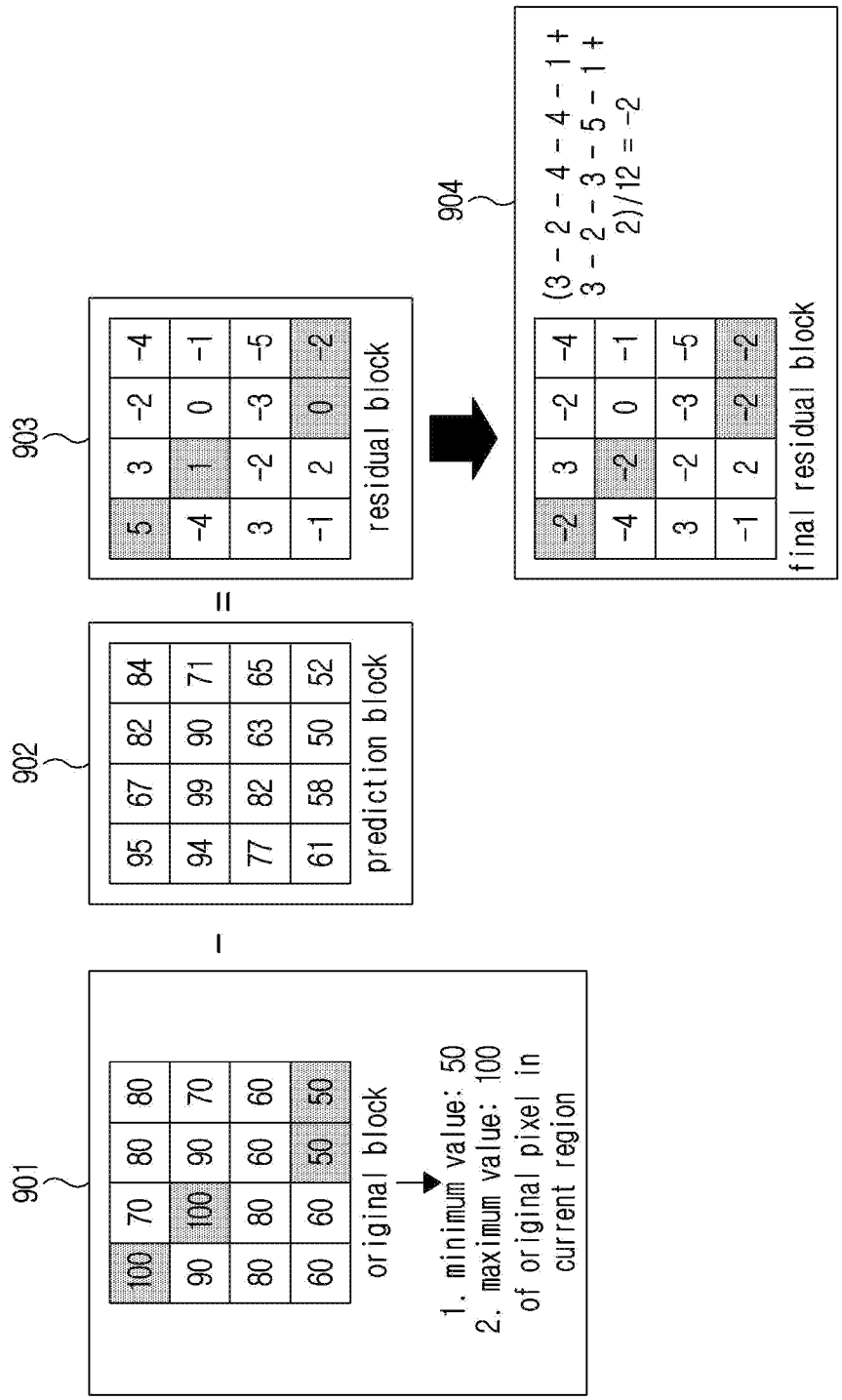
FIG. 9 is a diagram illustrating a method of correcting coefficients of residual blocks using a clipping range of an arbitrary region unit.

FIG. 9 is a diagram illustrating a method of correcting coefficients of residual blocks using a clipping range of an arbitrary region unit. The correction of the coefficients of the residual block described with reference to FIG. 9 may or may not be performed on a per-arbitrary region basis.

In FIG. 9, the numbers displayed in the inner grid of an original block 901, a prediction block 902, a residual block 903, and a final residual block 904 indicate pixel values of the corresponding pixels. The residual block 903 is generated by subtracting the pixel value of the prediction block 902 from the pixel value of the original block 910. The final residual block 904 is generated by correcting the residual block 903.

Assuming that a minimum value of a pixel value in an original block 901 or any region including the original block 901 is 50 and a maximum value thereof is 100, the clipping range of the original block 901 is 50 to 100. Pixels that are shaded areas in the original block 901 mean pixels having the maximum value or the minimum value of the current clipping range.

The residual coefficient correction for the residual block 903 may be performed on the pixels that are shaded areas in the residual block 903, which correspond to the positions of the pixels that are shaded areas in the original block 901. Specifically, an average value (−2 in FIG. 9) of pixel values of residual pixels that are not shaded areas in the residual block 903 is calculated. Subsequently, the pixels that are shaded areas in the residual block 903 are replaced with the calculated average value. Through this process, a final residual block 904 may be generated. Other statistical values such as maximum value, minimum value, intermediate value, mode value, and weighted average value may be used instead of the average value used for residual coefficient correction.

Figure 10:
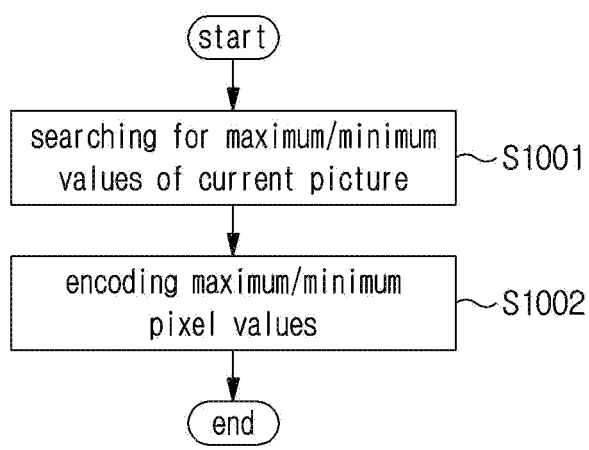
FIG. 10 is a diagram illustrating a method of encoding clipping information on a per picture basis.

FIG. 10 is a diagram illustrating a method of encoding clipping information on a per picture basis.

In step S1001, a maximum value and a minimum value of the pixel values within the picture are searched for current picture unit by current picture unit. In step S1002, the maximum value and the minimum value are encoded. The maximum and minimum values may be directly encoded. Alternatively, after encoding the minimum value, the difference value between the maximum value and the minimum value may be encoded. Alternatively, after encoding the maximum value, the difference value between the maximum value and the minimum value may be encoded. Herein, the encoding information for the maximum value and the minimum value may be transmitted in the picture layer, the slice layer, or the like. The picture unit may be changed into an arbitrary region unit. The arbitrary region may be a slice, a tile, a CTU, a CU, or the like.

Figure 11:
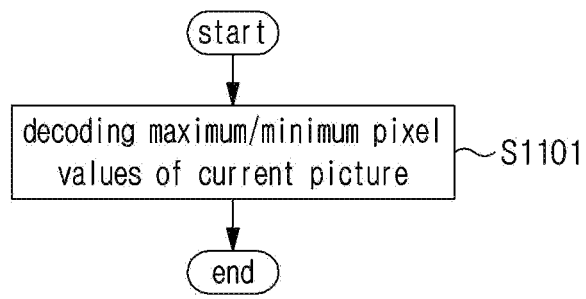
FIG. 11 is a diagram illustrating a method of decoding clipping information on a per picture basis.

FIG. 11 is a diagram illustrating a method of decoding clipping information on a per picture basis. In step S1101, information on the maximum value and the minimum value of the current picture may be decoded. The information on the maximum value and the minimum value may be included in the transmission unit transmitted from the image encoding device 100. The transmission unit may be a picture layer or a slice layer. Information on the maximum value and the minimum value may be encoded and transmitted as described with reference to FIG. 10. The picture unit may be changed into an arbitrary region unit. The arbitrary region may be a slice, a tile, a CTU, a CU, or the like.

Figure 12:
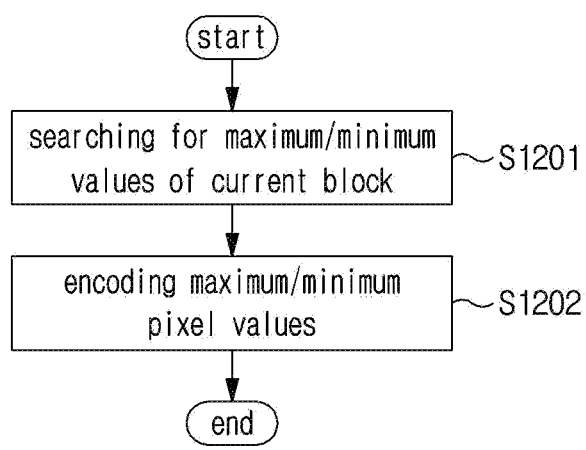
FIG. 12 is a diagram illustrating a method of encoding clipping information on a per block basis.

FIG. 12 is a diagram illustrating a method of encoding clipping information on a per-arbitrary block basis. In step S1201, the maximum and minimum pixel values in a block are searched for current block unit by current block unit. In step S1202, the maximum value and the minimum value are encoded. The maximum and minimum values may be directly encoded. Alternatively, after encoding the minimum value, the difference value between the maximum value and the minimum value may be encoded. Alternatively, after coding the maximum value, the difference value between the maximum value and the minimum value may be encoded. Herein, the encoding information on the maximum value and the minimum value may be transmitted on a per block basis. The block unit may be, for example, any coding block unit or prediction block unit.

Figure 13:
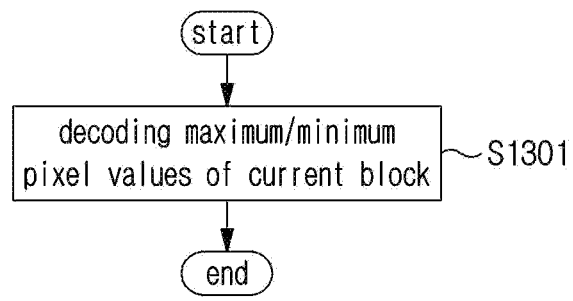
FIG. 13 is a diagram illustrating a method of decoding clipping information on a per block basis.

FIG. 13 is a diagram illustrating a method of decoding clipping information on a per-arbitrary block basis. In step S1301, information on the maximum value and the minimum value of the current block may be decoded. The information on the maximum value and the minimum value may be included in the transmission unit transmitted from the image encoding device 100. The transmission unit may be an arbitrary encoding block unit or a prediction block unit. The information on the maximum value and the minimum value may be encoded and transmitted as described with reference to FIG. 12.

Figure 14:
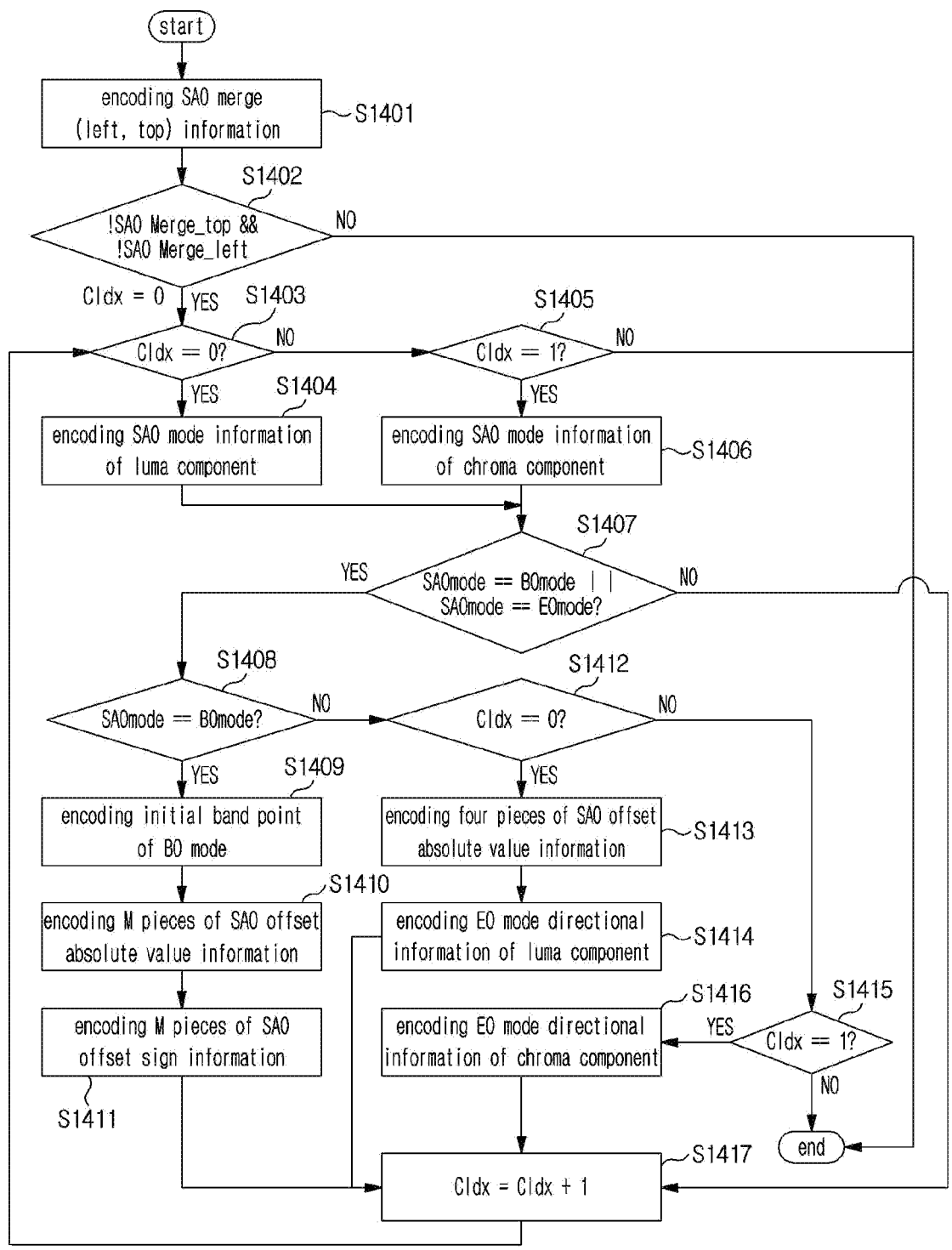
FIG. 14 is a diagram illustrating a method of encoding SAO information on the basis of a clipping range according to an embodiment of the present invention.

FIG. 14 is a diagram illustrating a method of encoding SAO information on the basis of a clipping range according to an embodiment of the present invention.

The description of steps S1401 to S1406 is the same as the description of steps S501 to S506 of FIG. 5.

In step S1407, when the SAO mode for the current block is the SAO non-operation mode, the process proceeds to step S1417. When the SA mode is one of the BO mode and the EO mode for the current block, the process moves to step S1408.

In step S1408, it is determined whether the SAO mode for the current block is the BO mode or not. When it is the BO mode, the process proceeds to step S1409. When it is not the BO mode, the process proceeds to step S1412.

In step S1409, an initial band point indicating where consecutive bands section of the BO mode start is encoded.

In step S1410, M pieces of offset absolute value information for the BO mode are encoded. As described above, the available band section of the BO mode may also be changed according to the clipping range. Accordingly, the number of offsets required to be transmitted may vary depending on the initial band point. Alternatively, the number of offsets required to be transmitted may vary depending on the number of available bands. The M means the number of offsets to be transmitted, which may vary depending on the clipping range. For example, in the example shown in FIG. 7, when the initial band point is a band No. 25, the available bands are bands Nos. 25 and 26, so that only two offset values may be transmitted.

In step S1411, sign information of the offsets as the number M of offsets transmitted in step S1410 is encoded.

In step S1412, it is determined whether CIdx is 0 or not. When the CIdx is 0, the process proceeds to step S1413. Otherwise, the process proceeds to step S1415.

In step S1413, four pieces of absolute value information used in the EO mode are encoded.

In step S1414, directional information of the EO mode of the luma component is encoded.

In step S1415, it is determined whether the CIdx is 1 or not. When the CIdx is not 1, the process is terminated. When the CIdx is 1, the process proceeds to step S1416.

In step S1416, directional information of the EO mode of the chroma component is encoded. Here, both the Cb and Cr components of the chroma component may share the same directional information.

In step S1417, the value of CIdx is incremented by one, and the process moves to step S1403 so that the above-described process is repeated.

Figure 15:
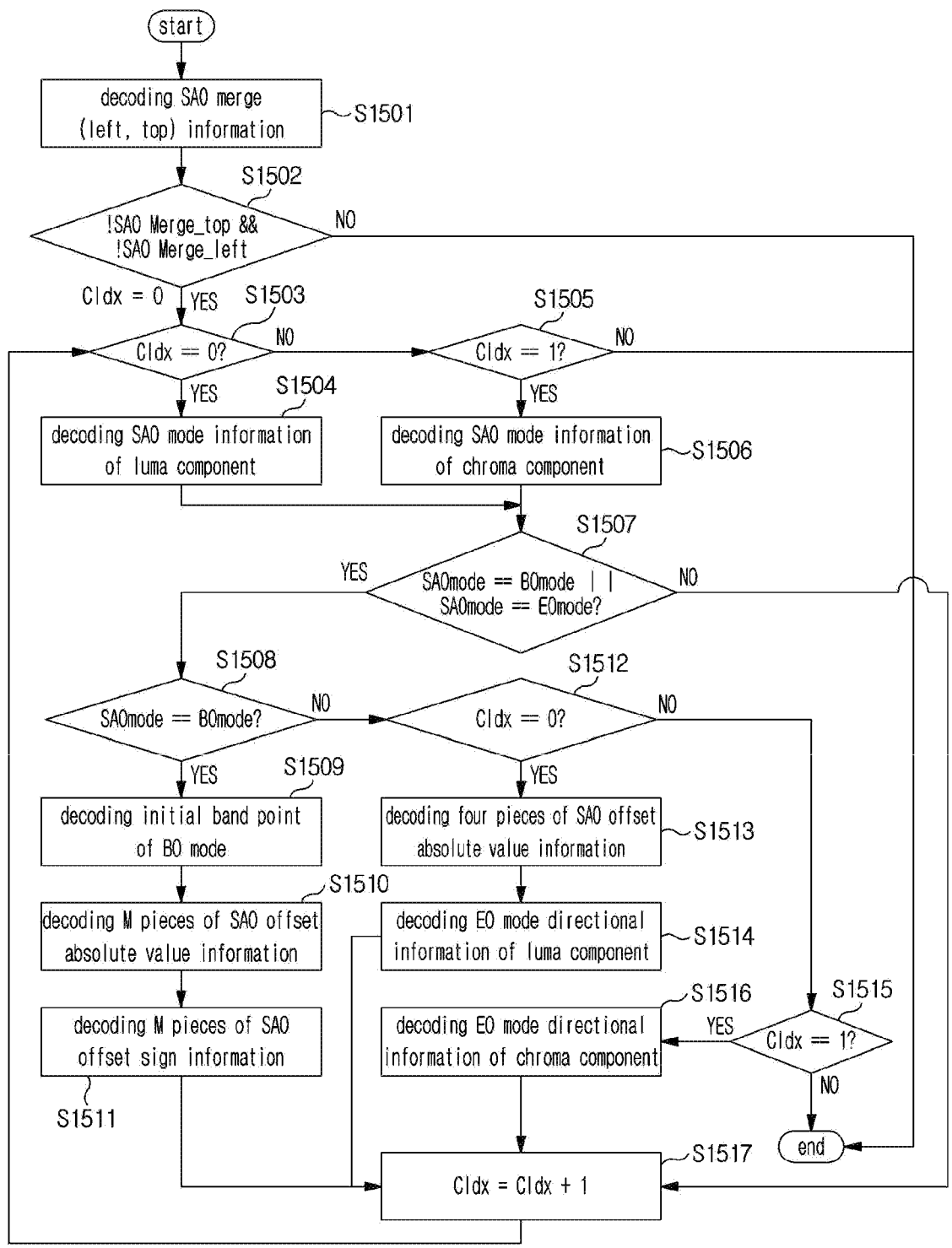
FIG. 15 is a diagram illustrating a method of decoding SAO information on the basis of a clipping range according to an embodiment of the present invention.

FIG. 15 is a diagram illustrating a method of decoding SAO information on the basis of a clipping range according to an embodiment of the present invention.

The description of steps S1501 to S1506 is the same as the description of steps S601 to S606 of FIG. 6.

In step S1507, when the SAO mode for the current block is the SAO non-operation mode, the process proceeds to step S1517. When the SAO mode for the current block is the BO mode or the EO mode, the process moves to step S1508.

In step S1508, it is determined whether or not the SAO mode for the current block is the BO mode or not. When it is the BO mode, the process proceeds to step S1509. When it is not the BO mode, the process proceeds to step S1512.

In step S1509, the initial band point of the BO mode encoded in step S1409 of FIG. 14 is decoded.

In step S1510, the M pieces of offset absolute value information for the BO mode encoded in step S1410 of FIG. 14 are decoded.

In step 1511, the M pieces of offset sign information encoded in step S1411 of FIG. 14 are decoded.

In step S1512, it is determined whether CIdx is 0 or not. When it is 0, the process proceeds to step S1513. Otherwise, the process proceeds to step S1515.

In step S1513, the four pieces of offset absolute value information used in the EO mode encoded in step S1413 of FIG. 14 are decoded.

In step S1514, the directional information of the EO mode of the luma component encoded in step S1414 of FIG. 14 is decoded.

In step S1515, it is determined whether the CIdx is 1 or not. When the CIdx is not 1, the process is terminated. When the CIdx is 1, the process proceeds to step S1516.

In step S1516, the directional information of the EO mode of the chroma component is decoded. Here, both the Cb and Cr components of the chroma component may share the same directional information.

In step S1517, the value of CIdx is incremented by one, and the process moves to step S1503 so that the above-described process is repeated.

Figure 16:
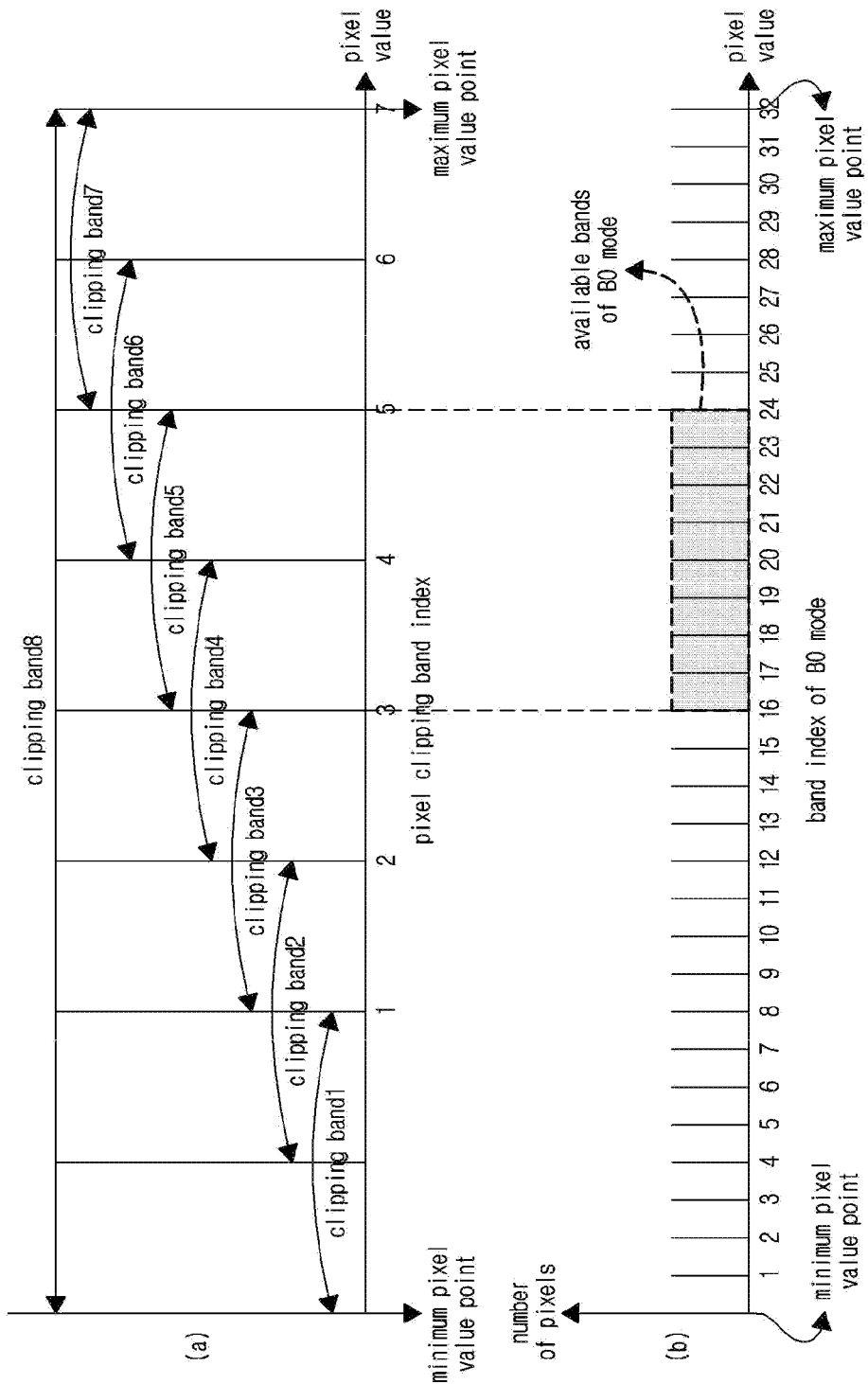
FIG. 16 is a view illustrating a clipping band determination method according to the present invention.

FIG. 16 is a view illustrating a clipping band determination method according to the present invention.

According to the example shown in FIG. 16, it is possible to determine an available band section of the BO mode by using an optimal clipping band among predetermined clipping bands in an arbitrary region unit such as a current picture, a slice, a tile, block, and the like.

In the example shown in FIG. 16 (a), the minimum pixel value point is 0, and the maximum pixel value point is 255. Here, the predetermined clipping band means each section obtained by dividing the range of the maximum pixel value to the minimum pixel value into N (N>1, N is an integer) sections. The image encoding device 100 and the image decoding device 200 may share the predetermined information about the clipping band. Alternatively, the image encoding device 100 may transmit information about the clipping band to the image decoding device 200. Alternatively, the image encoding device 100 and the image decoding device 200 manage various variations related to the determination of clipping bands in a lookup table, and the image encoding device 100 transmits only index information on the lookup table to the image decoding device 200.

In the example shown in FIG. 16 (a), there are a total of eight clipping bands. A clipping band 8 means the whole pixel section (0 to 255), clipping bands 1 to 7 are (0 to 63), (32 to 95), (64 to 127), (96 to 159) 191), (160-223), and (192-255) pixel sections, respectively. In the example shown in FIG. 16 (a), the clipping band is set to overlap with the adjacent clipping band. However, it is not limited thereto, and the clipping band may be set not to overlap with the adjacent clipping band. Alternatively, some of the clipping bands may be set to overlap with other clipping bands, and some of the clipping bands may be set not to overlap with other clipping bands.

After scanning pixel values in the corresponding region in units of a current picture, a slice, a tile, or an arbitrary block, it is determined to which clipping band a range of pixel values in the corresponding region belongs among the predetermined clipping bands. In the example shown in FIG. 16 (a), it is determined that all the pixels of the current region are distributed in the clipping band 5. As shown in FIG. 16 (b), the clipping band 5 corresponds to bands Nos. 17 to 24 among 32 bands in the BO mode. That is, the available band section in the BO mode of the current region is a section of the bands Nos. 17 to 24 that are shaded areas in FIG. 16 (b). There are no pixels belonging to bands Nos. 1 to 16 and bands Nos. 25 to 32 of the BO mode in the current region. Therefore, the filtering may be performed with not taking in account of the corresponding bands as bands of the BO mode.

Figure 17:
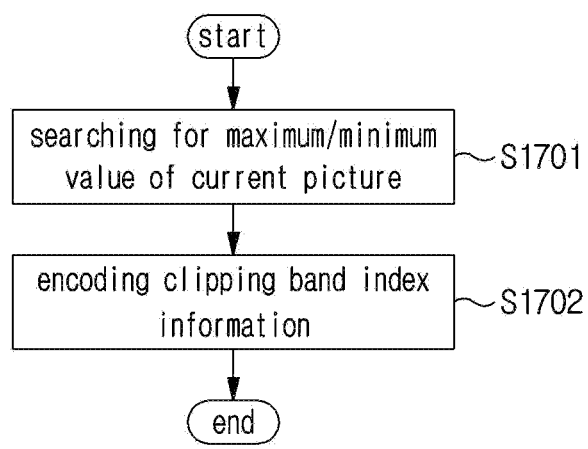
FIG. 17 is a diagram illustrating a method of encoding clipping information on a per picture basis.

FIG. 17 is a diagram illustrating a method of encoding clipping information on a per picture basis. In step S1701, the maximum value and the minimum pixel value of the pixel value within the picture are searched for current picture unit by current picture unit. In step S1702, the clipping band index information including the maximum value and the minimum value is encoded. Herein, the clipping band index information may be transmitted in the picture layer, the slice layer, or the like. The clipping band index information may be information about one clipping band. Alternatively, the clipping band index information may be information about two clipping bands. For example, when there is no clipping band that includes both the maximum and minimum values of the current picture, the clipping band index information may include information about the clipping band including the maximum value and information about the clipping band including the minimum value.

Figure 18:
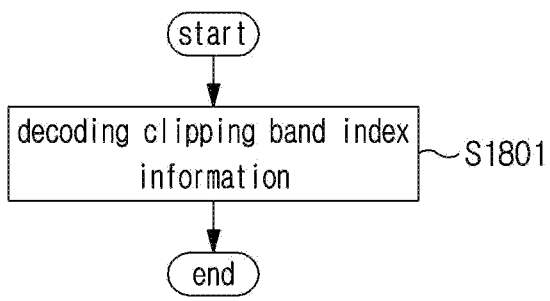
FIG. 18 is a diagram illustrating a method of decoding clipping information on a per picture basis.

FIG. 18 is a diagram illustrating a method of decoding clipping information on a per picture basis.

In step S1801, the clipping band index information of the current picture may be decoded. The clipping band index information may be included in the transmission unit transmitted from the image encoding device 100. The transmission unit may be a picture layer or a slice layer. The clipping band index information may be encoded and transmitted as described with reference to FIG. 17.

Figure 19:
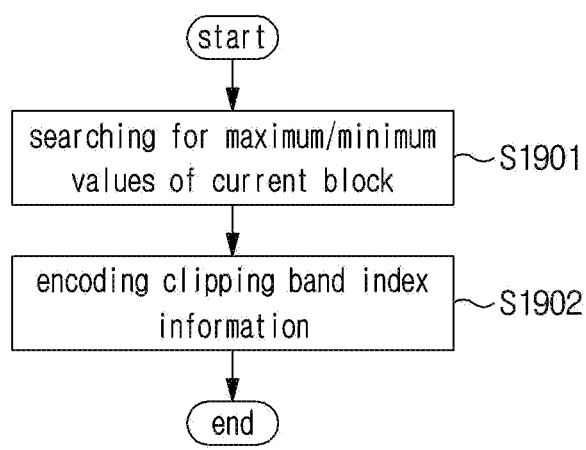
FIG. 19 is a diagram illustrating a method of encoding clipping information on a per block basis.

FIG. 19 is a diagram illustrating a method of encoding clipping information on a per block basis.

In step S1901, the maximum value and the minimum value in a block are searched for current block unit by current block unit. In step S1902, the clipping band index information including the maximum value and the minimum value is encoded. Herein, the clipping band index information may be transmitted on a per block basis. For example, the clipping band index information may be transmitted in any coding block unit, prediction block unit, or the like. The clipping band index information may be information on one clipping band. Alternatively, the clipping band index information may be information on two clipping bands. For example, when there is no clipping band that includes both the maximum and minimum values of the current block, the clipping band index information may include information on the clipping band including the maximum value and information on the clipping band including the minimum value.

Figure 20:
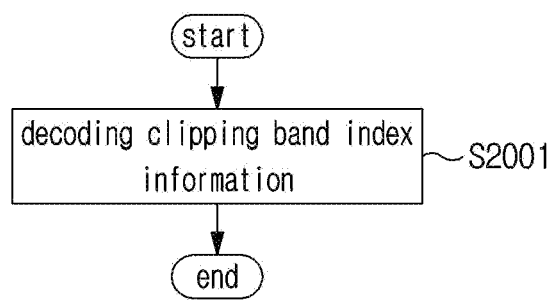
FIG. 20 is a diagram illustrating a method of decoding clipping information on a per block basis.

FIG. 20 is a diagram illustrating a method of decoding clipping information on a per block basis. In step S2001, the clipping band index information of the current block may be decoded. The clipping band index information may be included in the transmission unit transmitted from the image encoding device 100. The transmission unit may be an arbitrary coding block unit or a prediction block unit. The clipping band index information may be encoded and transmitted as described with reference to FIG. 19.

Figure 21:
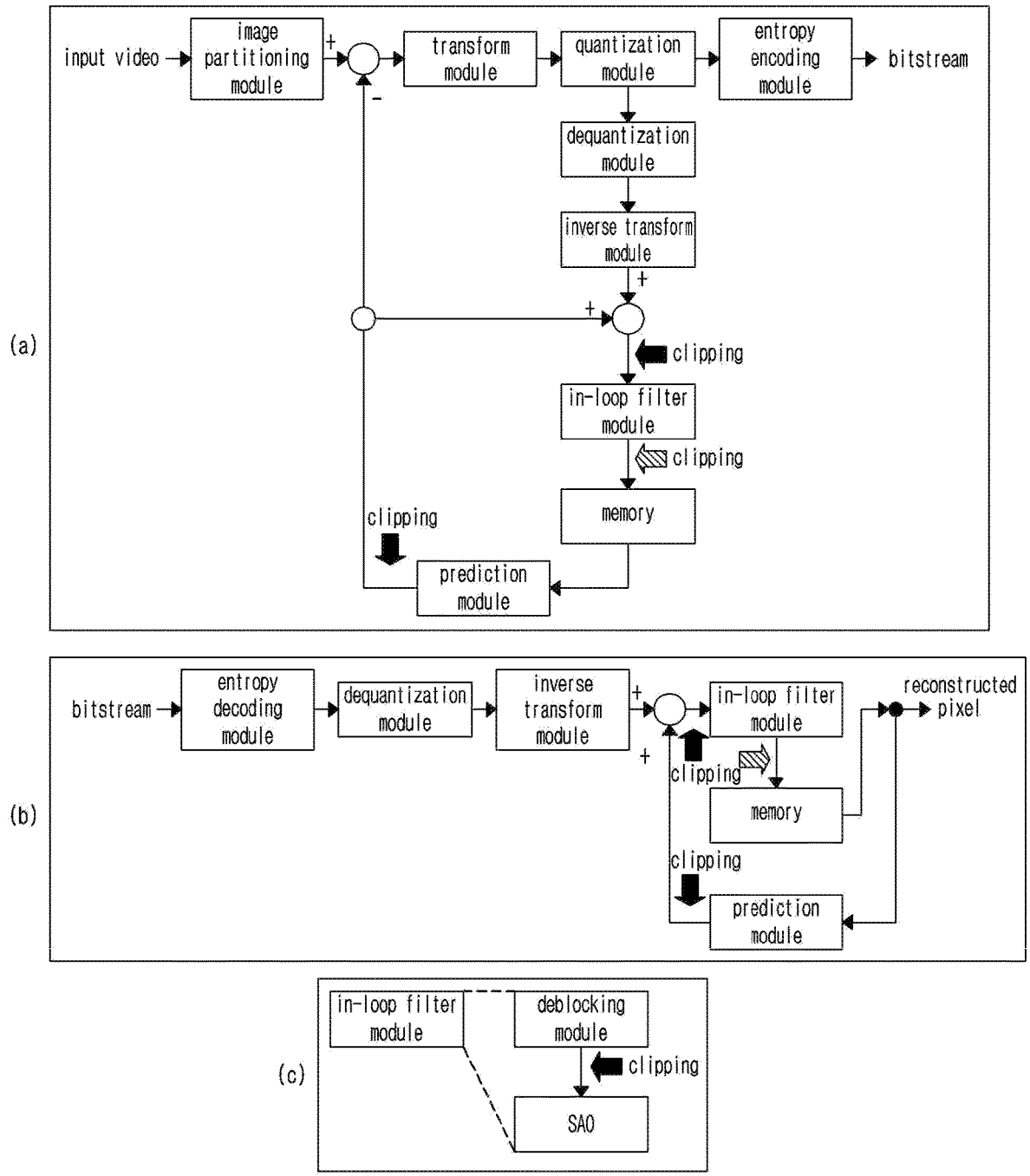
FIG. 21 is a diagram illustrating points to which clipping is applied in an image encoding device 100 and an image decoding device 200 according to the present invention.

FIG. 21 is a diagram illustrating points to which clipping is applied in an image encoding device 100 and an image decoding device 200 according to the present invention.

FIG. 21 (a) shows a point to which clipping is applied in the image encoding device 100. As shown in FIG. 21 (a), the clipping according to the present invention may be applied to a prediction block generated through a prediction module, applied to a reconstruction pixel before passing through an in-loop filter module, or applied after passing through an in-loop filter. In addition, as shown in FIG. 21 (c), the clipping may be applied after passing through the deblocking filter within the in-loop filter module. The clipping may be applied to all the clipping points described above, and may not be applied to some points. However, the clipping is necessarily applied after passing through the in-loop filter module, which is a clipping point of an arrow with oblique lines in FIG. 21 (a).

FIG. 21 (b) shows a point to which the clipping is applied in the image decoding device 200. As shown in FIG. 21 (b), the clipping according to the present invention may be applied after passing through a prediction module, applied to the reconstructed pixels before passing through an in-loop filter module, or applied after passing through an in-loop filter module. In addition, the clipping may be applied after passing through the deblocking filter in the in-loop filter module, as shown in FIG. 21 (c). The clipping may be applied to all of the clipping points described above, and may not be applied to some point. However, the image decoding device 200 is provided such that the clipping is necessarily applied to the same points as the clipping points in the image encoding device 100. In addition, the clipping is necessarily applied after passing through the in-loop filter module, which is the clipping point of the arrow with oblique lines in FIG. 21 (b).

Figure 22:
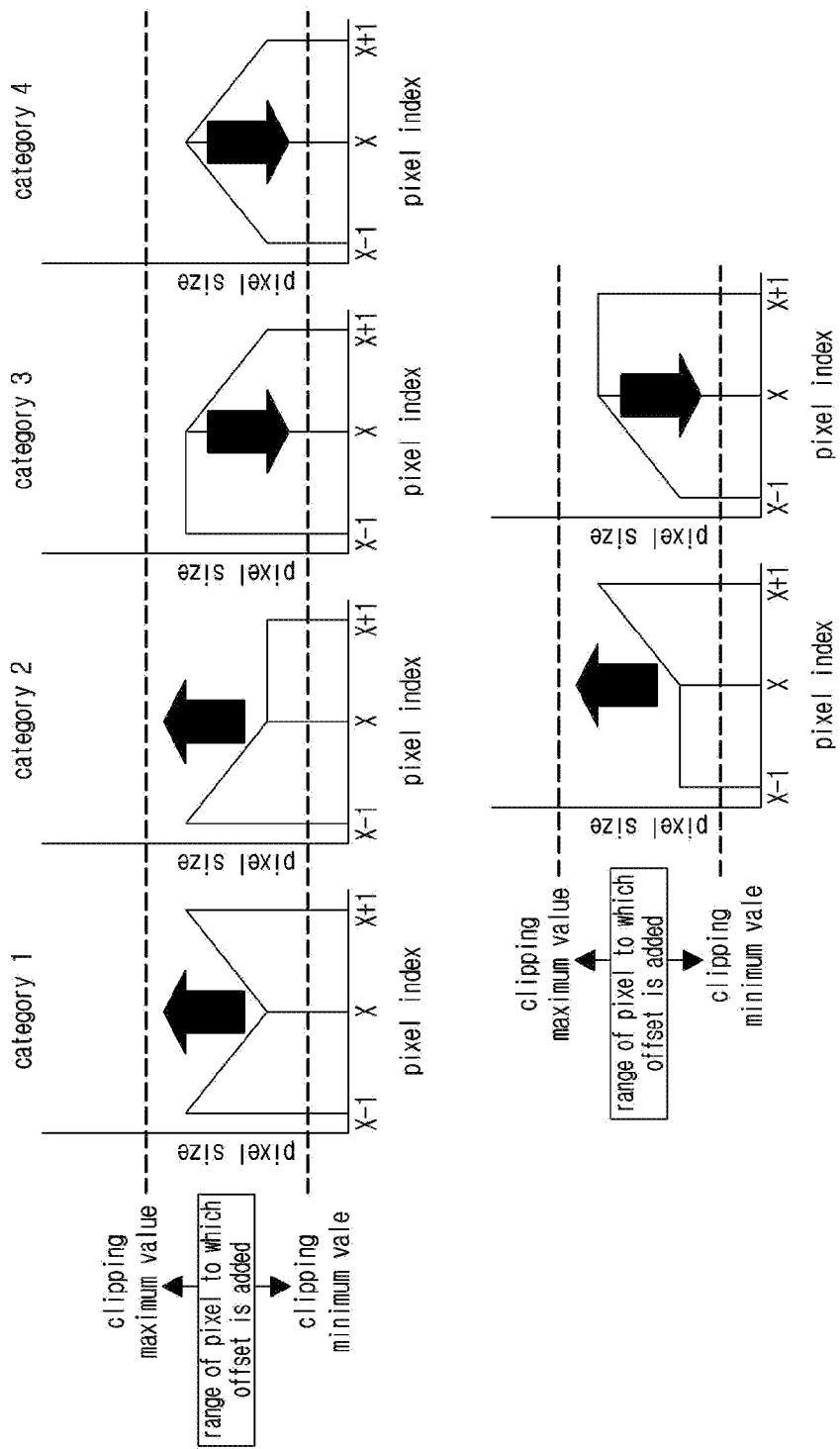
FIG. 22 is a diagram illustrating a method of determining an offset value in each category in consideration of a clipping range in the EO mode.

FIG. 22 is a diagram illustrating a method of determining an offset value in each category in consideration of a clipping range in the EO mode.

The sign (plus or minus) of each offset in the EO mode is pre-set for each category. In the image encoding device 100, an optimal offset value may be determined for each category using various methods such as RDO. However, when the determined offset value is out of the clipping range when applied to the current pixel, the offset value may not be considered in terms of RDO. That is, when the clipping range is determined on a per-arbitrary region basis, the range of the offset may be limited on the basis of this determination.

For example, it is assumed that the clipping range of the current region is 100 to 200, and the offset range is −7 to 7. It is also assumed that the pixel values of neighboring pixels of any pixel in the current region are 199, and the pixel value of the current pixel is 197. According to the above assumption, since the offset target pixel belongs to category 1, the sign of the offset is positive (+). When the offset value to be applied to the current pixel is 5, the filtering result value of the current pixel is 202, which is a value out of the clipping range of the current region. In this case, the range of the offset may be limited to −7 to 3. From the point of view of RDO, it is possible to determine the offset by determining which offset value is optimal within the range of −7 to 3. Therefore, in the example shown in FIG. 22, it is possible to determine the optimal offset value within the range by considering only the offset value that causes the range of the pixels to which the offset is added to be within the clipping range.

Figure 23:
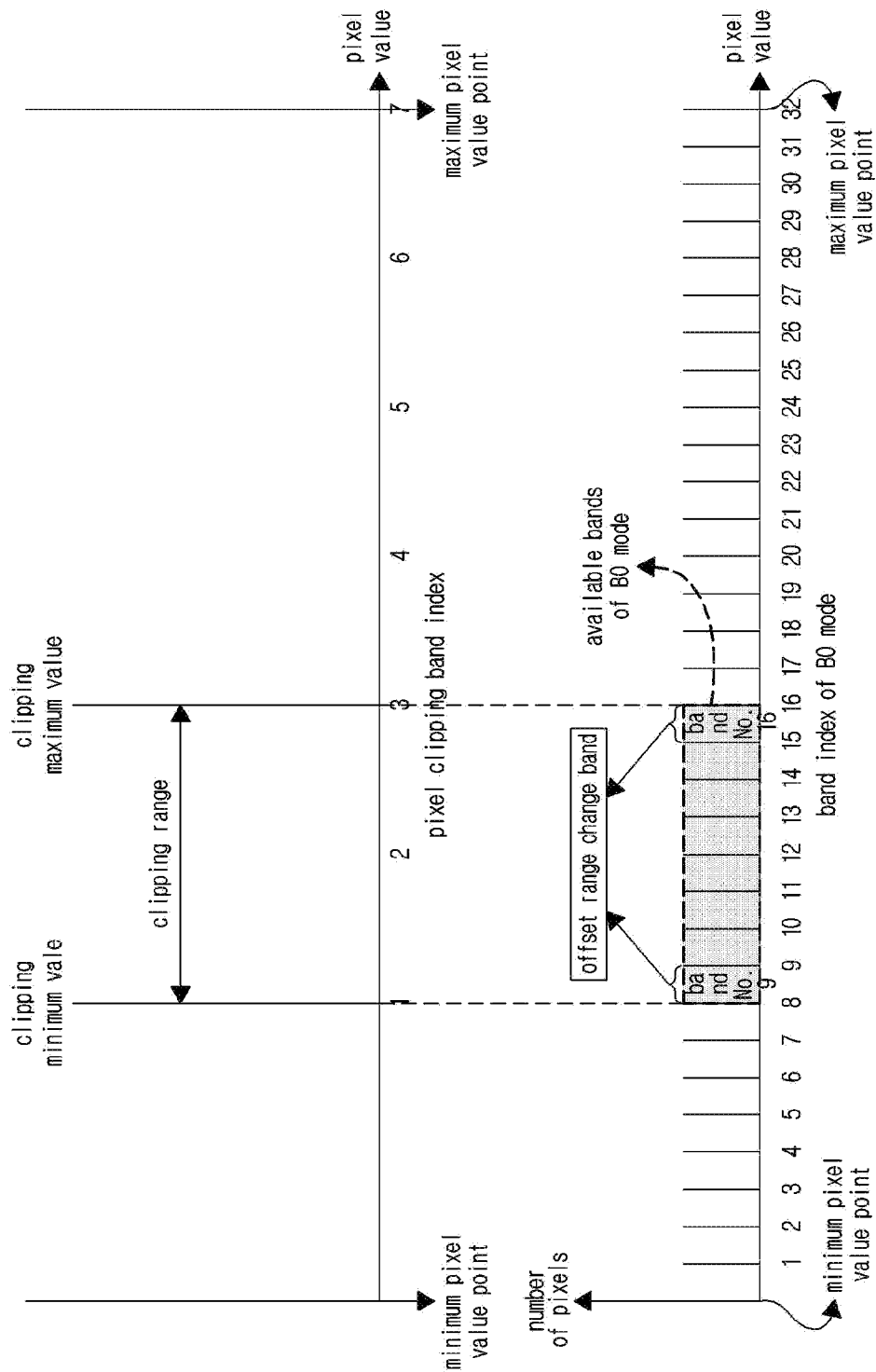
FIG. 23 is a diagram illustrating a method of determining an offset in consideration of a clipping range when determining an offset value for each band in the BO mode.

FIG. 23 is a diagram illustrating a method of determining an offset in consideration of a clipping range when determining an offset value for each band in the BO mode.

In the BO mode, the offset value is determined for each of four consecutive bands. When determining the offset value for each band, the offset value that causes the filtered pixel to be out of the clipping range may not be considered from the point of view of RDO. For a band including the minimum value or the maximum value of the clipping range among four consecutive bands, the range of the offset may be changed in consideration of the clipping range. This means that the range of the offset may be limited for each band as the clipping range is determined on a per-arbitrary region basis.

In the example shown in FIG. 23, when the target band of the BO mode is bands Nos. 9 to 12, the band 9 is a band including a clipping minimum value. Therefore, the offset that causes the current pixel value obtained by adding the offset value of the band No. 9 to be smaller than the clipping minimum value may not be considered as the optimal offset.

Alternatively, when the target bands of the BO mode are bands Nos. 13 to 16, the offset that causes the current pixel value obtained by adding the offset value of the band No. 16 to be larger than the clipping maximum value may not be considered as the optimum offset.

Figure 24:
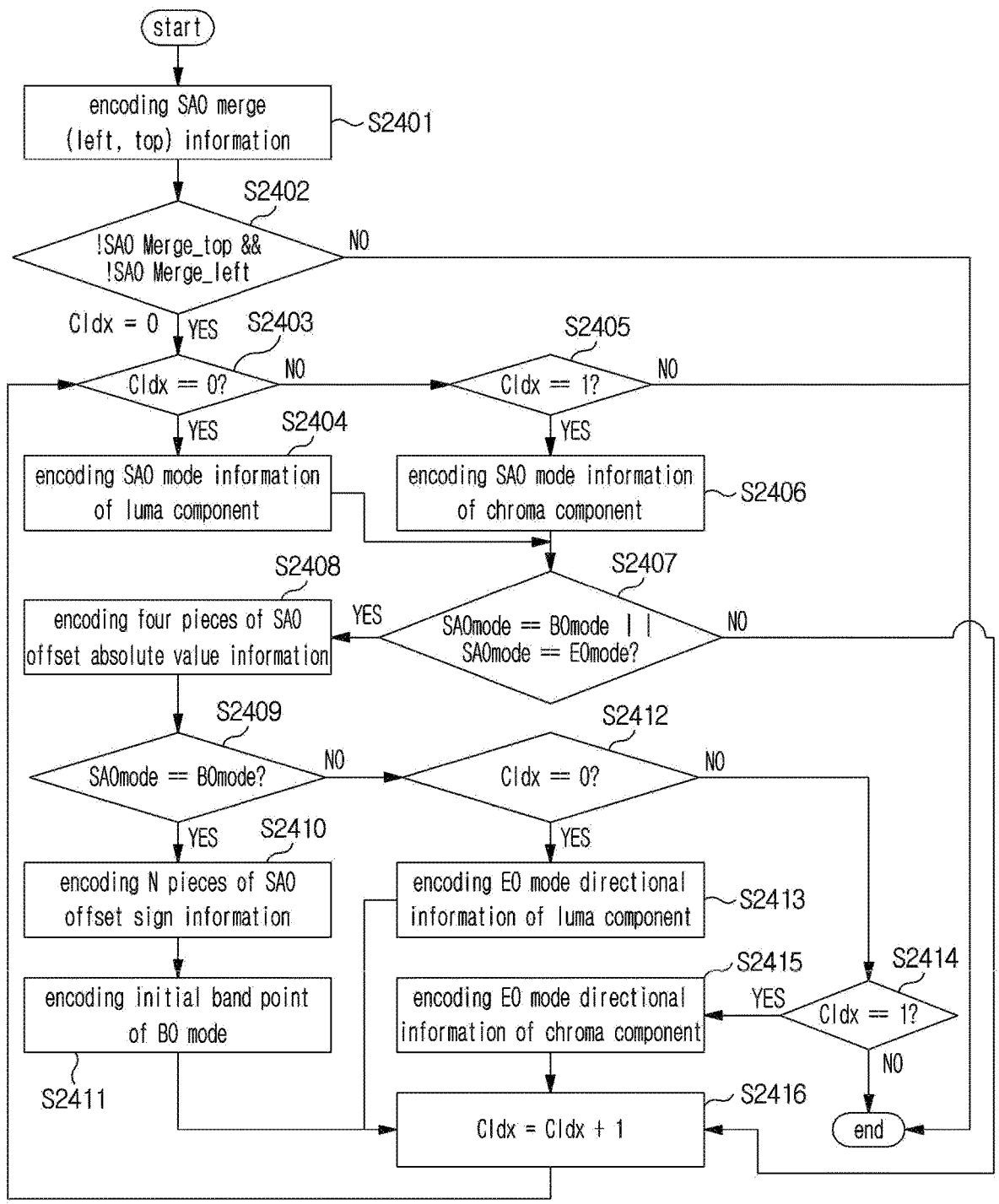
FIG. 24 is a diagram illustrating a method of encoding SAO information.

FIG. 24 is a diagram illustrating a method of encoding SAO information.

The description of steps S2401 to S2407 is the same as the description of steps S501 to S507 of FIG. 5.

In step S2408, four pieces of offset absolute value information are encoded.

In step S2409, it is determined whether or not the SAO mode for the current block is the BO mode. When it is the BO mode, the process proceeds to step S2410. When it is not the BO mode, the process proceeds to step S2412.

In step S2410, N pieces of offset sign information are encoded. N may be 3 or 4. In step S2408, four pieces of offset absolute value information are encoded. In step S2410, N pieces of sign information are coded. When some of four consecutive bands include a clipping maximum or minimum value, an offset that causes the filtered current pixel value to be out of the clipping range may not be considered as an offset value of the corresponding band. Therefore, plus (+) sign information of some offsets may not be encoded for a band including the clipping maximum value, and minus (−) sign information of some offsets may not be encoded for a band including the clipping minimum value.

For example, it is assumed that the clipping range of the current region is 100 to 200, four consecutive bands are bands Nos. 12 to 15, and the range of the current pixel to be filtered in the BO mode is 96 to 135. Further, when the range of the actual current pixel to be filtered in the band No. 12 is 101 to 103, values of −4 or less may not be considered as the range of the offset. Herein, when the offset of the band No. 12 encoded in step S2408 is 4 or more, the sign information may not be encoded in step S2410. Herein, the offset sign of the band No. 12 may be determined as plus (+) information.

In step S2411, an initial band point indicating where consecutive bands section of the BO mode starts is encoded.

In step S2412, it is determined whether CIdx is 0 or not. When the CIdx is 0, the process proceeds to step S2413. When the CIdx is not 0, the process proceeds to step S2414.

In step S2413, directional information of the BO mode of the luma component is encoded.

In step S2414, it is determined whether the CIdx is 1 or not. When the CIdx is not 1, the procedure is terminated. When the CIdx is 1, the process proceeds to step S2415.

In step S2415, directional information of the EO mode of the chroma component is encoded. Here, both the Cb and Cr components of the chroma component may share the same directional information.

In step S2416, the value of CIdx is incremented by one, and the process moves to step S2403 so that the above-described process is repeated.

Figure 25:
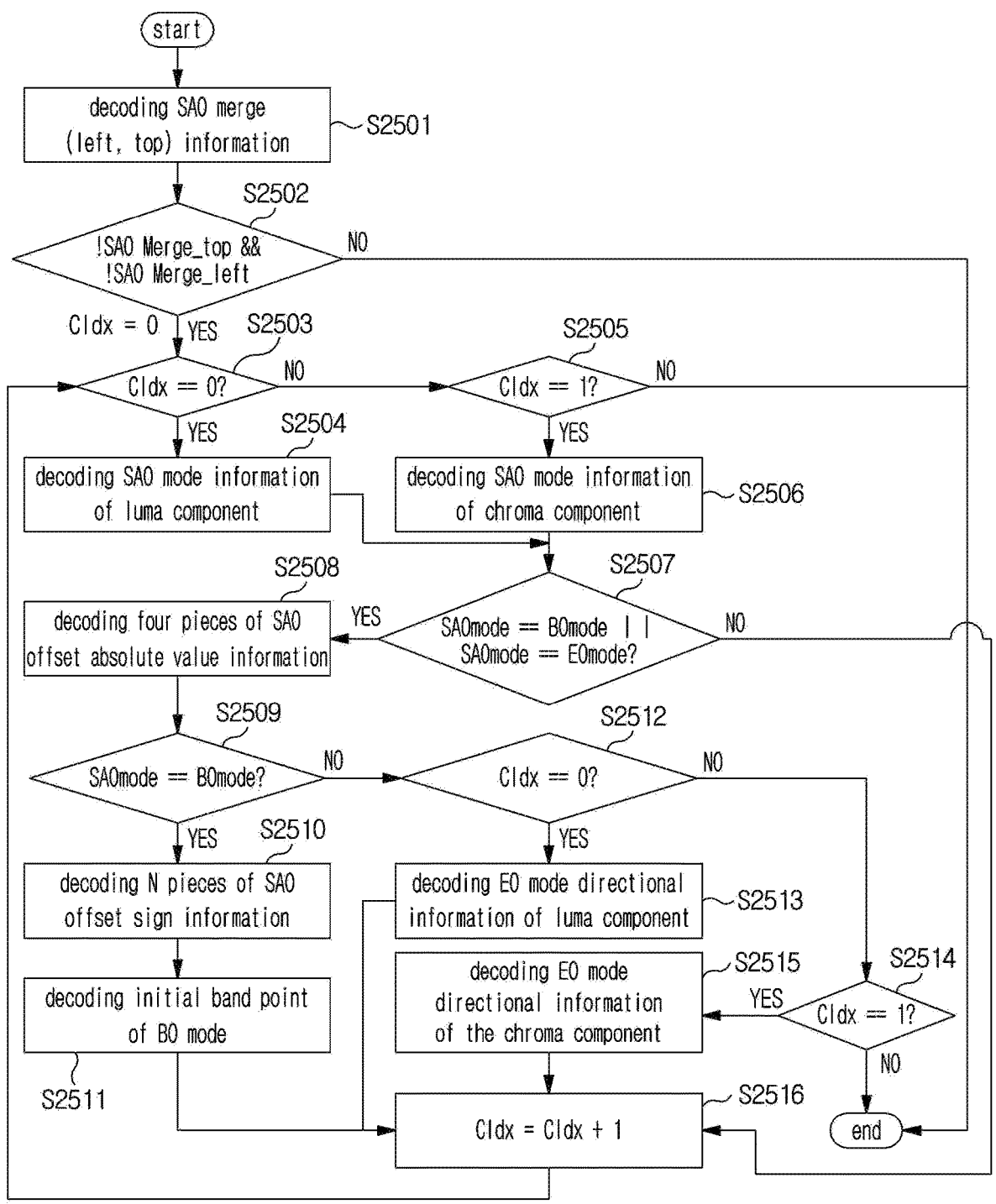
FIG. 25 is a diagram illustrating a method of decoding SAO information.

FIG. 25 is a diagram illustrating a method of decoding SAO information.

The description of steps S2501 to S2507 is the same as the description of steps S601 to S607 in FIG. 6.

In step S2508, four pieces of offset absolute value information are decoded.

In step S2509, it is determined whether or not the SAO mode for the current block is the BO mode. When it is the BO mode, the process proceeds to step S2510. When it is not the BO mode, the process proceeds to step S2512.

In step S2510, N pieces of offset sign information are decoded. N may be 3 or 4;

In step S2511, the initial band point indicating where the consecutive bands section of the BO mode starts is decoded.

In step S2512, it is determined whether CIdx is 0 or not. When it is 0, the process proceeds to step S2513. When it is not 0, the process proceeds to step S2514.

In step S2513, the EO mode directional information of the luma component is decoded.

In step S2514, it is determined whether CIdx is 1 or not. When it is not 1, the procedure is terminated. When it is 1, the process proceeds to step S2515.

In step S2515, the directional information of the EO mode of the chroma component is decoded. Here, both the Cb and Cr components of the chroma component may share the same directional information.

In step S2516, the value of CIdx is incremented by one, and the process moves to step S2503 so that the above-described process is repeated.

Figure 26:
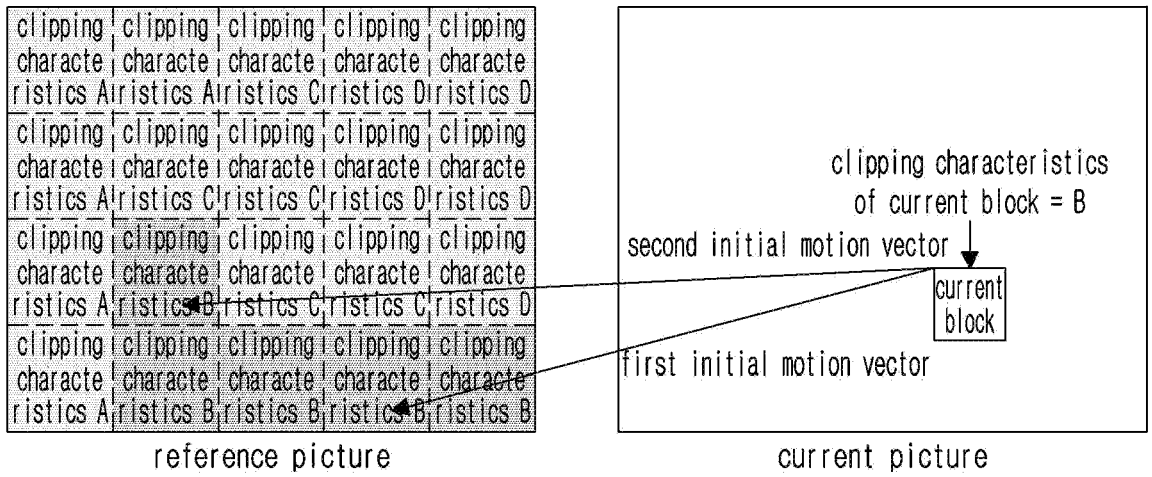
FIG. 26 is a diagram illustrating a process of performing decoder-side motion vector derivation (DMVD) on the basis of a clipping range according to still another embodiment of the present invention.

FIG. 26 is a diagram illustrating a process of performing decoder-side motion vector derivation (DMVD) on the basis of a clipping range according to still another embodiment of the present invention.

Generally, an image encoding device encodes information on motion vector and transmits a bitstream including the same to an image decoding device. The image decoding device may reconstruct the motion vector by decoding the bitstream. In the case of DMVD, the information on the motion vector is not explicitly encoded in the bitstream, but is derived by using a predetermined algorithm on the side of an image decoding device. For example, the predetermined algorithm may be a template matching algorithm.

According to the present invention, an image decoding device may perform the DMVD on the basis of clipping characteristics. For example, the DMVD may be efficiently performed by discriminating a region in a reference picture having the same or similar clipping characteristics as a current block or a region to which the current block belongs. The clipping characteristics may mean, but is not limited to, a clipping range and may include a variety of information on clipping derived from the clipping range.

More specifically, in order to perform the DMVD, it is necessary to determine an initial motion vector, and clipping characteristics may be considered upon determining the initial motion vector. In the example shown in FIG. 26, when the clipping characteristics of the current block is B, regions having the clipping characteristics B among regions in the reference picture are discriminated, and the initial motion vectors (first or second initial motion vectors) may be determined on the basis of the regions.

Since similar blocks have similar clipping characteristics, an optimal initial motion vector may be determined with a very high probability according to the present invention. Therefore, according to the present invention, the complexity of motion estimation of an image decoding device performing the DMVD may be remarkably reduced.

According to still another embodiment of the present invention, it is possible to improve the entropy encoding efficiency of the syntax element by using the clipping characteristic for entropy encoding and/or decoding.

Specifically, the initial probability of a predetermined syntax element may be adaptively selected in consideration of clipping characteristics of an arbitrary image region.

For example, when the clipping range of the encoding block is wide, that is, when the difference between the maximum value and the minimum value is large, the prediction accuracy of the encoding block is relatively low. When the prediction accuracy is relatively low, the probability that the residual block includes a non-zero transform coefficient increases, so that the probability of CBF_Flag of the corresponding encoding block being "1" is relatively higher than the probability thereof being "0".

On the contrary, when the clipping range of the coding block is narrow, that is, when the difference between the maximum value and the minimum value is small, the prediction accuracy of the coding block is relatively high. When the prediction accuracy is relatively high, the probability that the residual block includes a non-zero transform coefficient decreases, and therefore, the probability of CBF_Flag of the corresponding coding block being "0" is relatively higher than the probability thereof being "1".

Considering these statistical characteristics, initial probability information having a relatively high probability that CBF_Flag is "1" may be used for a coding block having a wide clipping range. Conversely, initial probability information having a relatively high probability that CBF_Flag is "0" may be used for an encoding block having a narrow clipping range.

The CBF_Flag may be a flag indicating whether a non-zero transform coefficient is included in the corresponding block. When CBF_Flag is 1, it means that the corresponding block includes at least one non-zero transform coefficient.

When CBF_Flag is 0, it means that the block does not include non-zero transform coefficients.

As another example, when the clipping range of a coding block is wide, inter prediction for the corresponding coding block has relatively high prediction accuracy. Therefore, the probability of the PredModeFlag of the coding block being "0" is relatively higher than the probability thereof being "1".

On the other hand, when the clipping range of a coding block is narrow, intra prediction has a relatively high prediction accuracy for the coding block. Therefore, the probability of PredModeFlag of the coding block being "0" is relatively higher than the probability thereof being "1".

Considering these statistical characteristics, initial probability information having a relatively high probability that the PredModeFlag is "1" may be used for a coding block having a wide clipping range. Conversely, initial probability information having a relatively high probability that the PredModeFlag is "0" may be used for a coding block having a narrow clipping range.

The PredModeFlag may be a flag indicating a prediction method applied to the block. When the PredModeFlag is 1, it means that inter prediction is applied to the corresponding block. When the PredModeFlag is 0, it means that intra prediction is applied to the block.

As described above, it is possible to optimize the context of a predetermined syntax element in consideration of the characteristics related to the clipping range. The predetermined syntax element is not limited to CBF_Flag and PredModeFlag, and an adaptive context probability may be applied to other syntax elements according to the clipping range.

Figure 27:
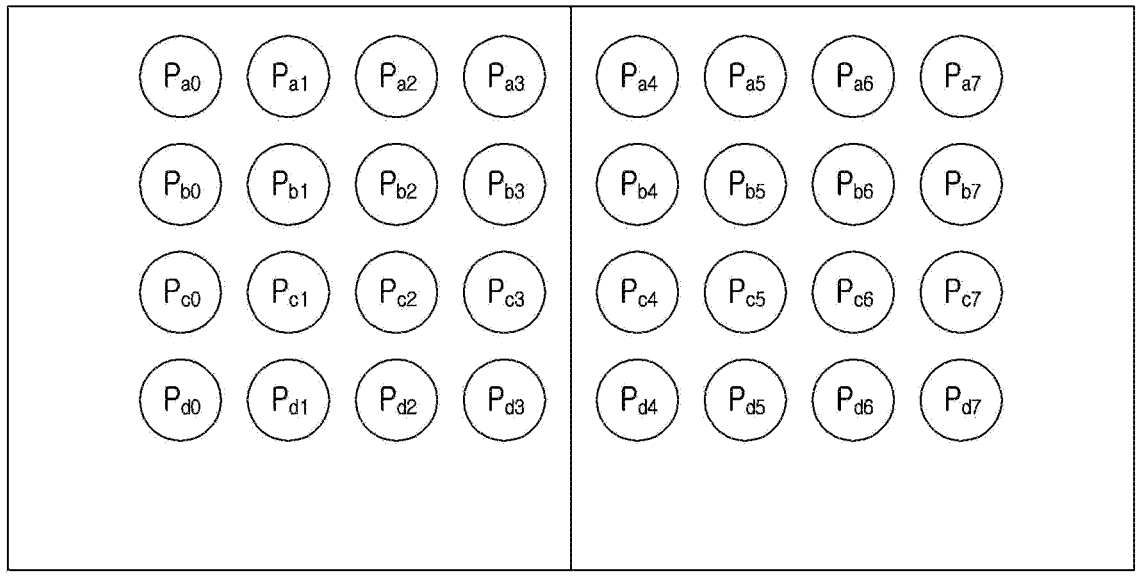
FIG. 27 is a diagram illustrating a process of performing deblocking filtering on the basis of a clipping range according to another embodiment of the present invention.

FIG. 27 is a diagram illustrating a process of performing deblocking filtering on the basis of a clipping range according to another embodiment of the present invention.

As shown in FIG. 27, a block A and a block B are adjacent to each other with a boundary therebetween. The clipping range of the block A is 50 to 160, and the clipping range of the block B is 90 to 200. In the example shown in FIG. 27, the clipping range of the block A and the clipping range of the block B are overlapped in the range of 90 to 160.

According to the present invention, deblocking filtering is adaptively performed considering the characteristics of the clipping range of the block A and the clipping range of the block B. More specifically, deblocking filtering is adaptively performed on the basis of the overlapping information of the clipping range of the block A and the clipping range of the block B.

For example, when the clipping range of the block A and the clipping range of the block B do not overlap, it is not preferable to filter the boundary between the two blocks because the two blocks are included in different regions. Therefore, in such a case, the filtering may not be performed on the boundary between the block A and the block B. Alternatively, even when the filtering is performed, the filtering coefficient for pixels belonging to the same block as the filtering target pixel may be set to be high (or extremely high), and the influence of pixels in the adjacent block may be reduced.

When the clipping range of the block A and the clipping range of the block B are partially overlapped, the filtering coefficient for the pixel belonging to the same block as the filtering target pixel may be set high. How high the filtering coefficient is set may be determined adaptively according to the overlapping degree of the clipping ranges. For example, as the overlapping degree of the clipping range is lower, the filtering coefficient for pixels belonging to the same block as the filtering target pixel may be set higher.

According to another embodiment of the present invention, the prediction mode may be limitedly used in consideration of clipping characteristics.

For example, when the clipping range of the coding block is wide, it may be determined that all predictions including intra prediction and inter prediction are possible for the coding block.

On the contrary, when the clipping range of the coding block is narrow, it may be determined that only a DC mode or a Planar mode is applicable in the case of intra prediction, and/or only a merge mode is applicable in the case of inter prediction, for the corresponding coding block.

Upon applying the intra prediction mode, it is possible to perform intra prediction referring to the pixels of the top adjacent block when the clipping characteristics of the top adjacent block and the clipping characteristics of the current block are similar. Conversely, when the clipping characteristics of the left adjacent block are similar to the clipping characteristics of the current block, it is possible to perform intra prediction referring to the pixels of the left adjacent block.

In the above-described embodiment, determination of whether the clipping range is wide or narrow (determination of wide and narrow) may be performed by comparing the clipping range with a predetermined threshold value. The predetermined threshold value may be signaled through a bitstream, or may use a threshold value predetermined in the image encoding device and the image decoding device. The predetermined threshold value may include a first threshold value for determining whether the clipping range is wide or not or a second threshold value for determining whether the clipping range is narrow or not. When the clipping range is located between the first threshold and the second threshold, the embodiments according to the present invention may not be applied.

In the above-described embodiment, determination of the overlapping degree of the clipping range may be performed through comparison with a predetermined threshold value. The predetermined threshold value may be signaled through a bitstream, or a predetermined threshold may be used in the image decoding device and the image decoding device. The overlapping degree of the clipping range may be determined adaptively according to whether the clipping range of each block is wide or narrow. For example, in the case that the clipping range of each of the block A and/or the block B is narrow, even when the clipping range of the two blocks is relatively narrow, it may be determined that they overlap a lot. Conversely, in the case that the clipping range of each of the block A and/or the block B is wide, even when the clipping range of the two blocks is relatively wide, it may be determined that they overlap a little.

In the above-described embodiments, the determination as to whether the clipping range is similar may be determined by at least one of the wideness and narrowness of the clipping range and the overlapping degree of the clipping range.

In the above-described embodiment, the clipping range may be derived by decoding information on the clipping range transmitted on a per-arbitrary region basis. However, substantially similar effects may be expected by modifying the various embodiments of the present disclosure utilizing the clipping range, even though information about the clipping range is not transmitted. For example, in the above-described embodiment, the clipping range of the region may be determined by searching for the maximum value and/or the minimum value of the pixels included in the region to which the clipping range is to be induced. More specifically, in the embodiment described with reference to FIG. 27, the clipping ranges of the block A and/or the block B may be determined by searching for the maximum value and/or the minimum value of the reconstructed pixel of the block A and/or block B. The clipping range determined as described above may be used in the same manner as the clipping range derived by decoding information on the clipping range.

Although the exemplary methods of the present disclosure are represented by a series of steps for clarity of description, they are not intended to limit the order in which the steps are performed. That is, if necessary, each step may be performed in parallel or performed in series in a different order. In order to implement the method according to the present disclosure, each of the embodiments described above may be modified such that some additional steps may be added to a corresponding embodiment or some existing steps may be eliminated from a corresponding embodiment. Alternatively, some additional steps are added and some existing steps are eliminated from a corresponding of the embodiments.

Various embodiments in the present disclosure are not intended to represent all of the possible combinations based on technical spirit of the present invention but are provided only for illustrative purposes. Elements or steps described in various embodiments may be applied independently or in combination.

Various embodiments in the present disclosure may be implemented by hardware, firmware, software, or a combination thereof. When implemented by hardware, each of the embodiments may be implemented by one or more application specific integrated circuits (ASICs), digital signal processors (DSPs), digital signal processing devices (DSPDs), programmable logic devices (PLDs), field programmable gate arrays (FPGAs), general processors, controllers, micro controllers, or micro-processors.

The scope of the present disclosure covers software or machine-executable commands (for example, operating systems (OSs), application programs, firmware, programs) that enable steps in various embodiments to be performed in a certain device or computer, and a non-transitory computer-readable medium in which such software or commands are stored so as to be executable in a certain device or computer when read out.

INDUSTRIAL APPLICABILITY

The present invention may be used to encode/decode an image.

The invention claimed is:

1. An image decoding method, comprising:
decoding band index information of a current block;
performing first filtering on pixels in the current block, based on the band index information, and
performing in-loop filtering in the current block after the first filtering, wherein the in-loop filtering includes a sample adaptive offset (SAO) mode,
wherein N bands are generated by dividing a range of pixels according to a bit depth,
wherein the band index information comprises first band index information indicating a band including a maximum value of the pixels among the N bands and second band index information indicating a band including a minimum value of the pixels among the N bands, and
wherein the method further comprises, decoding SAO merge information indicating whether SAO information of the current block is derived from SAO information of a neighboring block adjacent to the current block.

2. The method of claim 1, wherein the neighboring block adjacent to the current block includes a left coding block adjacent to the current block in a left side and a top coding block adjacent to the current block in a above side.

3. The method of claim 2, wherein the SAO merge information including SAO merge_left information indicating whether the SAO information of the left coding block is used for the current block and SAO merge_top information indicating whether the SAO information of the top coding block is used for the current block.

4. The method of claim 3, wherein the SAO merge_left information is firstly decoded and the SAO merge_top information is conditionally decoded when the SAO merge_left information indicates the SAO information of the left coding block is not used for the current block.

5. An image encoding method, comprising:
determining at least one band of a current block;
performing first filtering on pixels in the current block, based on the at least one band;
performing in-loop filtering in the current block after the first filtering, wherein the in-loop filtering includes a sample adaptive offset (SAO) mode,
encoding band index information related to the at least one band, and
encoding SAO merge information indicating whether SAO information of the current block is derived from SAO information of a neighboring block adjacent to the current block,
wherein N bands are generated by dividing a range of pixels according to a bit depth,
wherein the band index information comprises first band index information indicating a band including a maximum value of the pixels among the N bands and second band index information indicating a band including a minimum value of the pixels among the N bands.

6. The method of claim 5, wherein the neighboring block adjacent to the current block includes a left coding block adjacent to the current block in a left side and a top coding block adjacent to the current block in a above side.

7. The method of claim 6, wherein the SAO merge information including SAO merge_left information indicating whether the SAO information of the left coding block is used for the current block and SAO merge_top information indicating whether the SAO information of the top coding block is used for the current block.

8. The method of claim 7, wherein the SAO merge_left information is firstly encoded and the SAO merge_top information is conditionally encoded when the SAO merge_left information indicates the SAO information of the left coding block is not used for the current block.

9. A non-transitory computer-readable recording medium storing a bitstream generated by an image encoding method, the method comprising:
determining at least one band of a current block;
performing first filtering on pixels in the current block, based on the at least one band;
performing in-loop filtering in the current block after the first filtering, wherein the in-loop filtering includes a sample adaptive offset (SAO) mode,
encoding band index information related to the at least one band, and encoding SAO merge information indicating whether SAO information of the current block is derived from SAO information of a neighboring block adjacent to the current block, wherein N bands are generated by dividing a range of pixels according to a bit depth, wherein the band index information comprises first band index information indicating a band including a maximum value of the pixels among the N bands and second band index information indicating a band including a minimum value of the pixels among the N bands.

* * * * *